(12) United States Patent
Yamada

(10) Patent No.: US 9,203,332 B2
(45) Date of Patent: Dec. 1, 2015

(54) MOTOR DRIVE DEVICE

(75) Inventor: Hiroyuki Yamada, Iwata (JP)

(73) Assignee: NTN CORPORATION, Osaka (JP)

( * ) Notice: Subject to any disclaimer, the term of this patent is extended or adjusted under 35 U.S.C. 154(b) by 176 days.

(21) Appl. No.: 14/125,866

(22) PCT Filed: Jun. 27, 2012

(86) PCT No.: PCT/JP2012/066365
§ 371 (c)(1),
(2), (4) Date: Dec. 12, 2013

(87) PCT Pub. No.: WO2013/002251
PCT Pub. Date: Jan. 3, 2013

(65) Prior Publication Data
US 2014/0111130 A1    Apr. 24, 2014

(30) Foreign Application Priority Data

Jun. 30, 2011   (JP) .................. 2011-145559
Jul. 6, 2011   (JP) .................. 2011-149944
Jul. 6, 2011   (JP) .................. 2011-149945

(51) Int. Cl.
*H02K 29/06*     (2006.01)
*H02P 6/18*     (2006.01)
(Continued)

(52) U.S. Cl.
CPC ............. *H02P 6/18* (2013.01); *B60L 3/0038* (2013.01); *B60L 3/0084* (2013.01); *B60L 3/102* (2013.01); *B60L 3/108* (2013.01); *B60L 3/12* (2013.01); *B60L 7/14* (2013.01); *B60L 11/1803* (2013.01); *B60L 15/2009* (2013.01); *B60L 2220/14* (2013.01); *B60L 2220/44* (2013.01); *B60L 2240/421* (2013.01); *B60L 2240/423* (2013.01);
(Continued)

(58) Field of Classification Search
CPC .... B60L 2240/421; B60L 3/0038; H02P 6/18
See application file for complete search history.

(56) References Cited

U.S. PATENT DOCUMENTS 8,217,545 B2    7/2012   Kawasaki et al.
8,564,232 B2   10/2013   Sato
(Continued)

FOREIGN PATENT DOCUMENTS

JP     58-89003     5/1983
JP     7-274585    10/1995
(Continued)

OTHER PUBLICATIONS

International Search Report mailed Sep. 18, 2012 in corresponding International Application PCT/JP2012/066365.
(Continued)

*Primary Examiner* — Karen Masih

(57) ABSTRACT

A motor drive device is provided which allows control to be performed depending on a position of magnetic poles of a rotor even when a motor rotor angle sensor malfunctions. The device controls a motor for driving a wheel of an electric vehicle, depending on the position of the magnetic poles by using an angle sensed by the angle sensor provided at the motor. The device includes an estimator estimating an angle of a rotor of the motor without using a rotation sensor; a sensor malfunction determiner determining a malfunction of the angle sensor; and a switcher causing control to be performed using a angle estimated by the estimator instead of the angle sensed by the angle sensor once the determiner determines that the angle sensor malfunctions.

13 Claims, 19 Drawing Sheets

(51) Int. Cl.
  *B60L 3/00* (2006.01)
  *B60L 3/10* (2006.01)
  *B60L 3/12* (2006.01)
  *B60L 7/14* (2006.01)
  *B60L 11/18* (2006.01)
  *B60L 15/20* (2006.01)

(52) U.S. Cl.
  CPC ...... *B60L 2240/427* (2013.01); *B60L 2240/429* (2013.01); *B60L 2240/461* (2013.01); *B60L 2260/44* (2013.01); *Y02T 10/642* (2013.01); *Y02T 10/7005* (2013.01); *Y02T 10/7275* (2013.01)

(56) References Cited

U.S. PATENT DOCUMENTS

| | | | |
|---|---|---|---|
| 8,807,253 | B2 | 8/2014 | Suzuki |
| 2010/0207475 | A1 | 8/2010 | Kawasaki et al. |
| 2011/0043146 | A1 | 2/2011 | Sato |
| 2012/0241233 | A1 | 9/2012 | Suzuki |
| 2013/0138300 | A1* | 5/2013 | Hayama ......................... 701/43 |

FOREIGN PATENT DOCUMENTS

| | | |
|---|---|---|
| JP | 10-14300 | 1/1998 |
| JP | 11-248487 | 9/1999 |
| JP | 2000-134716 | 5/2000 |
| JP | 2006-117124 | 5/2006 |
| JP | 2007-209105 | 8/2007 |
| JP | 2010-22196 | 1/2010 |
| JP | 2010-29028 | 2/2010 |
| JP | 2010-41868 | 2/2010 |
| JP | 2010-193609 | 9/2010 |
| WO | WO 2011/070882 A1 | 6/2011 |

OTHER PUBLICATIONS

Japanese Patent Office Decision of Grant dated Feb. 3, 2015 in corresponding Japanese Patent Application No. 2011-149944.

International Preliminary Report on Patentability mailed Jan. 16, 2014 in corresponding International Patent Application No. PCT/JP2012/066365.

Japanese Office Action issued Sep. 9, 2014 in corresponding Japanese Patent Application No. 2011-145559.

* cited by examiner

SINUSOIDAL DRIVE (PWM)

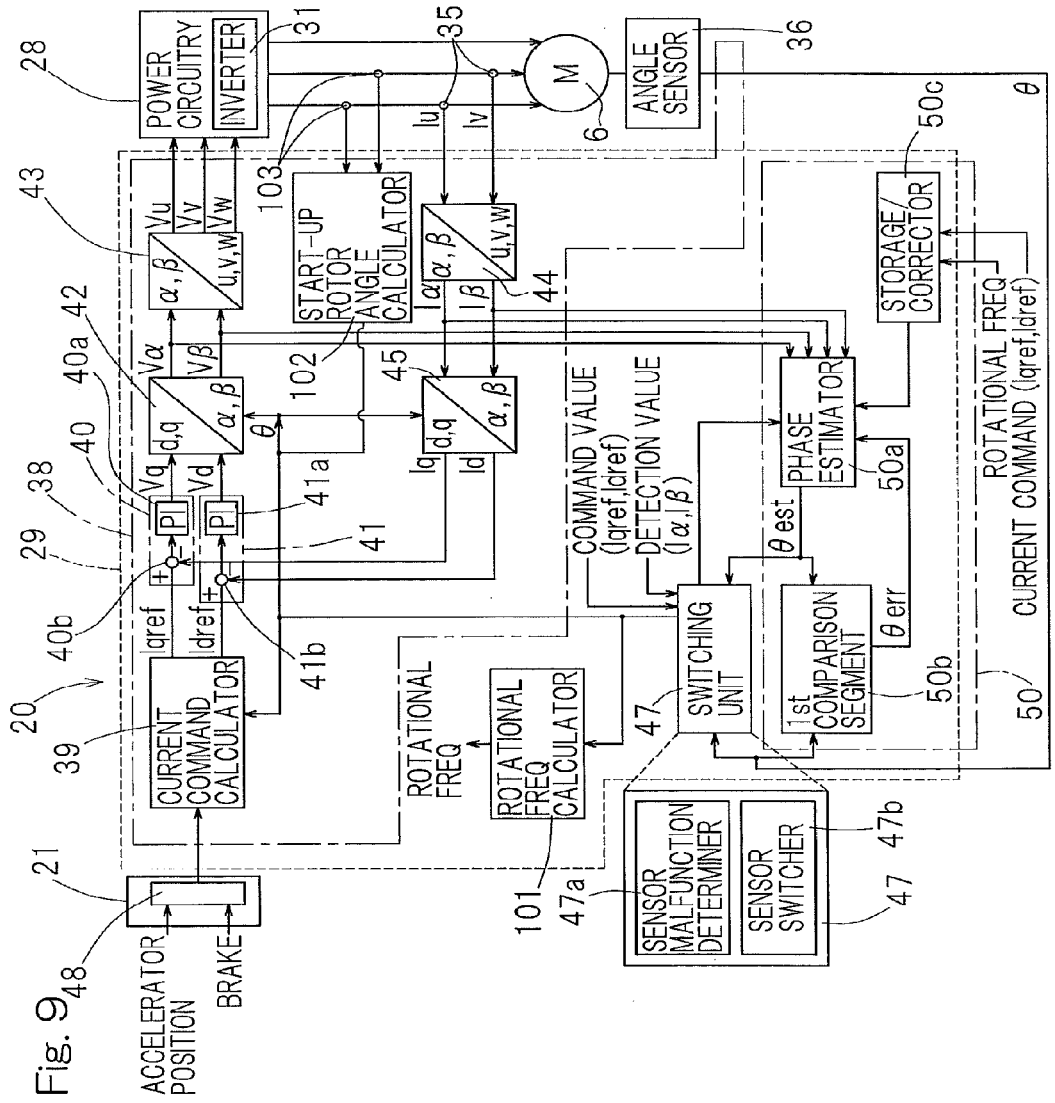

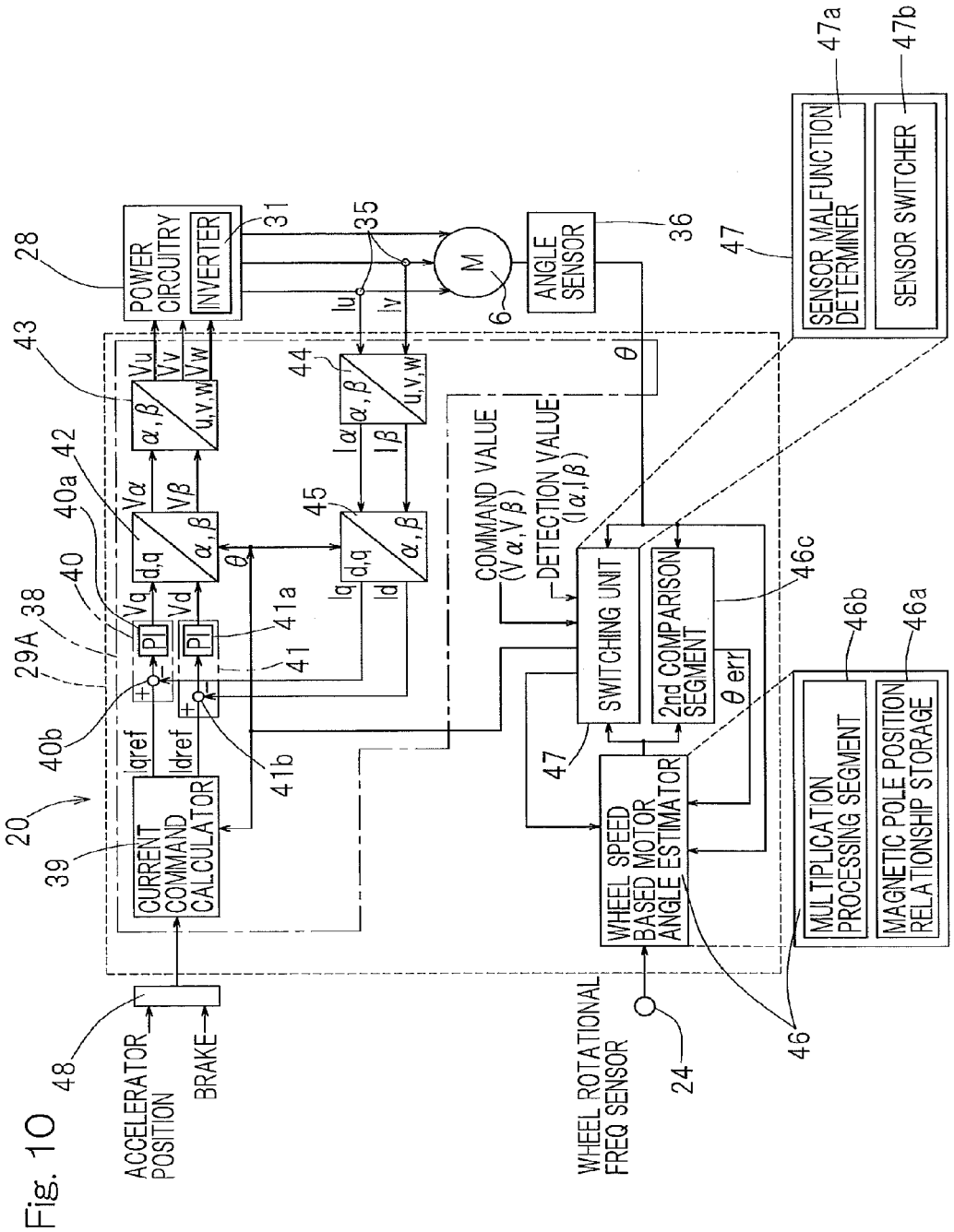

MULTIPLICATION

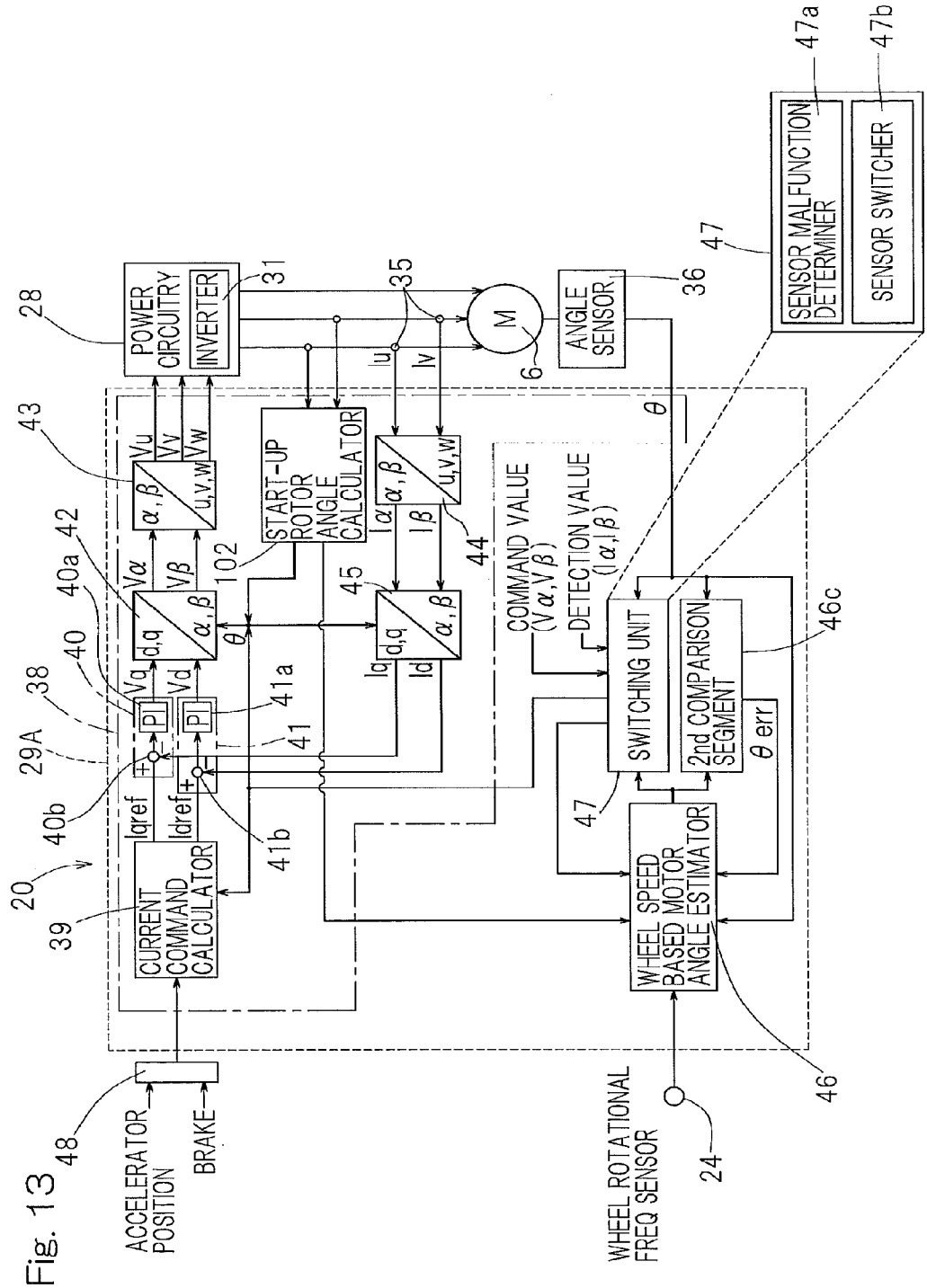

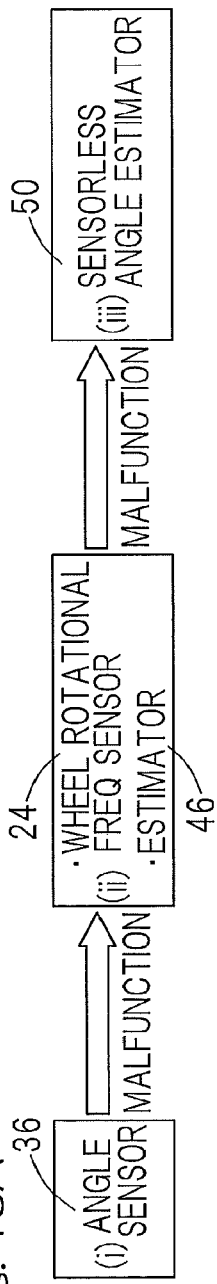
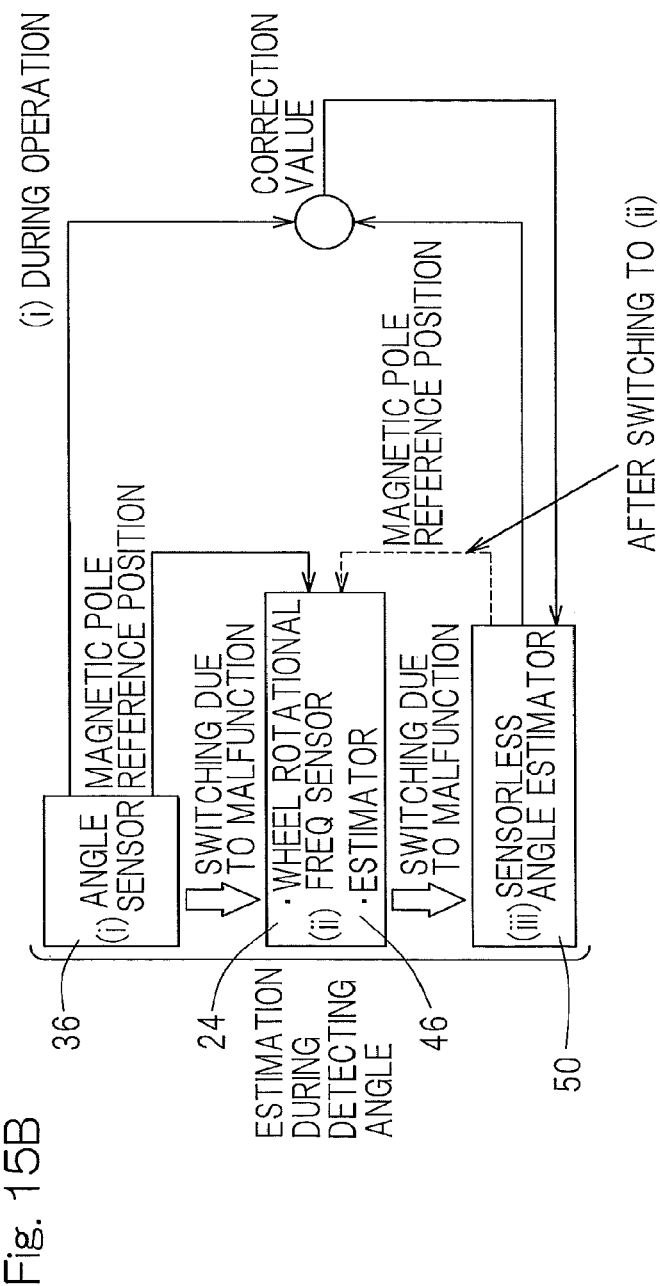
Fig. 15A
Fig. 15B

Fig. 18

MOTOR DRIVE DEVICE

CROSS REFERENCE TO THE RELATED APPLICATION

This application is a U.S. national stage application of PCT/JP2012/066365 filed Jun. 27, 2012 and claims foreign priority benefit of Japanese Application Nos. 2011-145559, filed Jun. 30, 2011, 2011-149944, filed Jul. 6, 2011, and 2011-149945, filed Jul. 6, 2011, in the Japanese Intellectual Property Office, the contents of all of which are incorporated herein by reference.

BACKGROUND OF THE INVENTION

1. Field of the Invention

The present invention relates to a motor drive device that may control a motor for driving a wheel in an electric vehicle.

2. Description of Related Art

In an electric vehicle, for efficiently driving a motor, control is performed based on the position of magnetic poles of a motor rotor, using an angle sensor which may be configured to sense an angle of the motor rotor. As this control, for example, field oriented control or vector control is used (Patent Document 1 and Patent Document 2).

PRIOR ART DOCUMENT

[Patent Document 1] JP Laid-open Patent Publication No. H10-14300
[Patent Document 2] JP Laid-open Patent Publication No. 2000-134716

SUMMARY OF THE INVENTION

In a motor drive device t sensed hat performs control based on the position of magnetic poles of a motor rotor as described in Patent Document 1 and Patent Document 2 listed above, when damage of an angle sensor for the motor rotor, breaking of a wire thereof, or the like occurs, an angle detection value cannot be properly recognized, and driving of the motor is no longer possible. Or, occurrence of desired torque is no longer possible.

In an electric vehicle of an in-wheel motor type including motors configured to individually drive respective wheels, when a malfunction of a motor rotor angle sensor occurs during travelling, an imbalance is produced in torque, which may cause a slip or skid.

When the vehicle stops on a road and motor driving is kept impossible, the vehicle may cause a traffic disturbance or the like. Thus, even when a malfunction occurs in the angle sensor for the motor rotor or a wiring system thereof, if the vehicle is able to travel to a safe location at a roadside by itself or travel to a repair shop by itself, the malfunction is easily handled.

An object of the present invention is to provide a motor drive device that allows control to be performed based on the position of magnetic poles of a motor rotor to enable motor driving even when a malfunction occurs in a motor rotor angle sensor (i.e., a motor rotor angle sensor). The general aspects of the present invention will now be described using the reference signs in the figures showing embodiments of the present invention.

A motor drive device 20 according to the present invention includes: a general drive controller 38 configured to control a motor unit 6 for driving a wheel of an electric vehicle, depending on a position of magnetic poles by using an angle detection value sensed by a motor rotor angle sensor 36 provided at the motor unit 6; at least one motor rotor angle estimator of a sensorless angle estimator (first motor rotor angle estimator) 50 configured to estimate an angle of a motor rotor of the motor unit 6 without using a rotation sensor and a wheel speed corresponding motor rotor angle estimator (second motor rotor angle estimator) 46 configured to estimate an angle of the motor rotor based on a detection signal detected by a wheel rotational frequency sensor 24 configured to sense a rotation speed of the wheel driven by the motor unit 6; a sensor malfunction determiner 47a configured to determine a malfunction of the motor rotor angle sensor 36; and a sensor switcher 47b configured to cause the general drive controller 38 to perform control using the motor rotor angle estimated by the one motor rotor angle estimator 50 or 46 instead of the angle detection value sensed by the motor rotor angle sensor 36 once the sensor malfunction determiner 47a determines that the motor rotor angle sensor 36 malfunctions. The wheel rotational frequency sensor 24 may be a sensor used for controlling an anti-lock-braking system.

According to this configuration, in a normal state, control based on the position of the magnetic poles may be performed by the general drive controller 38 in accordance with the angle detection value of the motor rotor angle sensor 36, and efficient motor driving may be performed. A malfunction of the motor rotor angle sensor 36 may be monitored and determined by the sensor malfunction determiner 47a. The determination by the sensor malfunction determiner 47a as to a malfunction of the motor rotor angle sensor 36 may be performed including a wiring system of the motor rotor angle sensor 36, or for only the motor rotor angle sensor 36. When the motor rotor angle sensor 36 is determined as malfunctioning by the sensor malfunction determiner 47a, the sensor switcher 47b may cause the general drive controller 38 to perform control using the motor rotor angle produced from the sensorless angle estimator 50 or the wheel speed based motor rotor angle estimator 46 instead of the angle detection value sensed by the motor rotor angle sensor 36. Thus, even when a malfunction occurs in the motor rotor angle sensor 36, control based on the position of the magnetic poles can be performed by the general drive controller 38.

Therefore, in an electric vehicle of an in-wheel motor type or the like including the motor units 6 that may be configured to individually drive the respective wheels 2, even when a malfunction occurs in the motor rotor angle sensor 36 during travelling, production of an imbalance in torque can be avoided, and occurrence of a slip or skid can be prevented. The motor rotor angle produced from the sensorless angle estimator 50 or the wheel speed based motor rotor angle estimator 46 may be insufficient in accuracy or reliability as compared to the angle detection value sensed by the motor rotor angle sensor 36 in some cases, but self-travelling is enabled to a place for vehicle repair such as a repair shop, or to a safe evacuation place at a roadside.

The wheel speed based motor rotor angle estimator 46 may use the detection signal detected by the wheel rotational frequency sensor 24. A general vehicle is equipped with a wheel rotational frequency sensor 24 in order to use the signal therefrom, for example, for controlling an anti-lock-braking system or an attitude control system. Thus, this wheel rotational frequency sensor 24 may be utilized, and it is unnecessary to newly add an extra sensor. Thus, without adding an extra sensor, motor driving can be performed when a malfunction occurs in the motor rotor angle sensor 36.

It is to be noted that "without using a rotation sensor" means that a detection value of a rotation sensor is not used. However, the case where a detection value of a rotation sensor is used for correction to make the estimation value of the motor rotor angle precise corresponds to "to estimate an angle of the motor rotor without using a rotation sensor".

In a preferred embodiment, both the sensorless angle estimator 50 and the wheel speed based motor rotor angle estimator 46 are provided; the sensor malfunction determiner 47a further determines a malfunction of the wheel rotational frequency sensor 24; and the sensor switcher 47b causes the general drive controller 38 to perform control using the motor rotor angle estimated by the wheel speed based motor rotor angle estimator 46 when the sensor malfunction determiner 47a determines that the motor rotor angle sensor 36 malfunctions, and the sensor switcher 47b causes the general drive controller 38 to perform control using the motor rotor angle estimated by the sensorless angle estimator 50 when the sensor malfunction determiner 47a determines that both the motor rotor angle sensor 36 and the wheel rotational frequency sensor 24 malfunction.

According to this configuration, when malfunctions occur in both the motor rotor angle sensor 36 and the wheel rotational frequency sensor 24, the sensor switcher 47b switches control with the general drive controller 38 to control with the sensorless angle estimator 50. Thus, even when both motor rotor angle sensor 36 and the wheel rotational frequency sensor 24 malfunction, travelling is enabled.

In the present invention, the sensor malfunction determiner 47a may determine a malfunction of the motor rotor angle sensor 36 based on any one of or both an amount of change in the angle detection value sensed by the motor rotor angle sensor 36 for a given time period and a difference between a command value Iqref, Idref (Vα, Vβ) which is generated by the general drive controller to be supplied to the motor unit and a detection value Iq, Id (Iα, Iβ) in the motor unit.

Normally, an amount of change in the angle detection value sensed by the motor rotor angle sensor 36 for the given time period falls within a range that is fixed to some extent. Thus, when the amount of change is extremely large, it is thought that the motor rotor angle sensor 36 malfunctions. In view of this, an appropriate threshold or the like may be defined, and when the above amount of change exceeds the threshold, it may be determined as a malfunction. The "given time period" may be appropriately defined. Also, normally a difference between a command value Iqref, Idref (Vα, Vβ) supplied to the motor unit and a detection value Iq, Id (Iα, Iβ) in the motor unit fall within a range that is fixed to some extent. In view of this, an appropriate threshold or the like may be defined, and when the differences exceed the threshold, it may be determined that the motor rotor angle sensor 36 malfunctions. Specifically, when at least any one of the difference between the torque current command value Iqref and the torque current detection value Iq and the difference between the magnetic flux current command value Idref and the magnetic flux current detection value Id exceeds the threshold, it may be determined that the motor rotor angle sensor 36 malfunctions. Each of the command value supplied to the motor unit and the detection value in the motor unit may be a value obtained by α, β coordinate conversion. When at least any one of the difference between the α component of the current command value corresponding to the motor voltage command value Vα and the α component of the motor current detection value Iα and the difference between the β component of the current command value corresponding to the motor voltage command value Vβ and the β component of the motor current detection value Iβ exceeds the threshold, it may be determined that the motor rotor angle sensor 36 malfunctions. In this case, an accelerator operation may be monitored, and when the command value Iqref, Idref supplied to the motor unit greatly change as a result of an accelerator operation, it may be determined that the motor rotor angle sensor 36 malfunctions. The malfunction determination may be performed using any one of the amount of change in the detection value of the motor rotor angle sensor 36 and the difference between the command value supplied to the motor unit and the detection value in the motor unit. When the malfunction determination is performed using both, each of the thresholds can be defined so as to be low, and thus, a reliable determination can be performed, and a malfunction determination can be performed at an early stage.

In the present invention, when the one motor rotor angle estimator is the sensorless angle estimator 50, while the general drive controller 38 controls the motor unit depending on the position of the magnetic poles using the angle detection value sensed by the motor rotor angle sensor 36, the sensorless angle estimator 50 may constantly estimate an angle of the motor rotor, may compare an estimation value of the estimated motor rotor angle with the angle detection value sensed by the motor rotor angle sensor 36, and may perform a correction process such that a difference between the estimation value and the detection value is minimized.

Since the angle estimation value of the sensorless angle estimator 50 has been corrected with the angle detection value of the motor rotor angle sensor 36 while the motor rotor angle sensor 36 is normal, sensorless angle estimation is enabled with high accuracy. This correction is performed, for example, by correcting a factor in a formula for calculating a motor rotor angle using a detection value such as a current value used for estimation or a preset parameter value such as the resistance value of a motor coil or an inductance. Regarding the above "constantly . . . correct . . . ", comparison and correction may not necessarily be performed all the time, and correction may be periodically performed.

When the one motor rotor angle estimator is the sensorless angle estimator 50, the sensorless angle estimator 50 includes, for example: a phase estimator 50a configured to constantly estimate an angle of the motor rotor while the general drive controller 38 controls the motor unit based on the position of the magnetic poles using the angle detection value sensed by the motor rotor angle sensor; a first comparison segment 50b configured to compare an estimation value estimated by the phase estimator 50a with the angle detection value sensed by the motor rotor angle sensor 36; and a correction value storage/corrector 50c configured to determine an adjusted value of each parameter for the motor unit or an offset value for adding an offset to the motor rotor angle estimation value, such that the adjusted value of each parameter or the offset value minimizes a result of the comparison, and to store the adjusted value or offset value (correction value). The correction value storage/corrector 50c determines a correction process based on the stored adjusted value or offset value (correction value) according to any one of or both a rotational frequency obtained from a wheel rotational frequency sensor 24 or a rotational frequency calculator 101 and a current command value produced from the general drive controller 38, and performs the correction process.

Sensorless angle estimation can be performed with higher accuracy by the phase estimator 50a, the first comparison segment 50b, and the correction value storage/corrector 50c.

In the present invention, a start-up rotor angle calculator 102 configured to calculate an angle of the motor rotor from a counter electromotive voltage of the motor unit 6 and to cause the general drive controller 38 to perform control using the calculated angle, when the motor unit 6 is started up after stop of the motor unit 6 in a state where the motor rotor angle sensor 36 is determined as malfunctioning by the sensor malfunction determiner 47a, may be further provided.

Since the general drive controller 38 may perform control based on the position of the magnetic poles in accordance with the angle detection value, the general drive controller 38 cannot rotate the motor unit 6 if the angle is unknown. Particularly, when the one motor rotor angle estimator is the wheel speed based motor rotor angle estimator 46, since an output signal of the wheel rotational frequency sensor 24 indicates a relative angle, an angle of the motor rotor cannot be identified at the time of start-up after stop unless a relationship between the relative angle and the position of the magnetic poles is stored. Even with the sensorless angle estimator 50, an angle of the motor rotor cannot be identified. Accordingly, at the time of start-up after stop, an angle of the motor rotor required for control based on the position of the magnetic poles is unknown. Therefore, when the motor unit 6 is stopped, the motor unit 6 cannot be started up immediately. However, in an electric vehicle including two or more motor units 6, travelling is enabled to some extent with the operable motor unit(s) 6. When travelling is performed, the motor unit 6 in which a sensor malfunction has occurred is rotated by rotation of the corresponding wheel 2. By detecting a counter electromotive force of the motor unit 6, it is possible to detect the position of the magnetic poles. Especially, it is possible to detect the position of the magnetic poles in one cycle in electrical angle. Thus, for example, at the time when a tire 2a rotates by a fraction of one rotation, it is made possible to sense an angle based on the counter electromotive force, and the motor unit 6 can be driven. As a result, the motor unit 6 can be driven until a difficulty in straightness occurs due to single-wheel driving.

In the present invention, when the one motor rotor angle estimator is the wheel speed based motor rotor angle estimator 46, the wheel rotational frequency sensor 24 may be able to detect only a relative angle change by calculating intervals between pulses generated in response to rotation of the wheel and detecting a rotation speed of the wheel. In this case, the wheel speed based motor rotor angle estimator 46 may calculate a position of the magnetic poles of the motor rotor relative to a detection signal detected by the wheel rotational frequency sensor 24 based on the angle detection value sensed by the motor rotor angle sensor 36 when the motor unit rotates, and may estimate an angle of the motor rotor based on the detection signal detected by the wheel rotational frequency sensor 24 once switching is performed by the sensor switcher 47b such that the motor rotor angle estimated by the wheel speed based motor rotor angle estimator 46 is used.

When an output signal of the wheel rotational frequency sensor 24 is a relative angle output, if a position of the magnetic poles of the rotor has been calculated based on the signal of the motor rotor angle sensor 36 while the motor rotor angle sensor 36 is normal, it is possible to use the output signal of the wheel rotational frequency sensor 24 for estimation of a motor rotor angle, at the time of switching when the motor rotor angle sensor 36 malfunctions during travelling.

In this case, the wheel speed based motor rotor angle estimator 46 may include a magnetic pole position relationship storage 46a configured to store a correlation between wheel rotational frequency(s) and position(s) of the magnetic poles by calculating the position(s) of the magnetic poles in accordance with the detection signal(s) detected by the wheel rotational frequency sensor 24 based on the angle detection values sensed by the motor rotor angle sensor 36, while the sensor malfunction determiner 47a determines that the motor rotor angle sensor 36 is normal.

In the case where the motor unit 6 includes a synchronous motor or the like, it is impossible to start rotation unless an angle of the motor rotor can be sensed. However, since the correlation of the position(s) of the magnetic poles relative to the detection signal(s) detected by the wheel rotational frequency sensor 24, that is, the magnetic pole positional relationship therebetween, is previously stored in the magnetic pole position relationship storage 46a, it is possible to perform start-up even after the power is turned on again. In addition, in the configuration with the magnetic pole position relationship storage 46a, in order to be able to recognize the position of the magnetic poles even when the wheel is rotated by an external factor in a state where the power is off, the wheel rotational frequency sensor 24 and the wheel speed based motor rotor angle estimator 46 are desirably configured to start operating when sensing rotation of the wheel even while the power is off.

In the present invention, when the one motor rotor angle estimator is the wheel speed based motor rotor angle estimator 46, the wheel rotational frequency sensor 24 may be configured to calculate intervals between pulses generated in response to rotation of the wheel and to sense a rotation speed of the wheel. In this case, the wheel speed based motor rotor angle estimator 46 may be configured to multiply pulses produced from the wheel rotational frequency sensor 24 and to estimate an angle of the motor rotor.

Since the wheel rotational frequency sensor 24 is used in an anti-lock-braking system or the like, high resolution is in general unnecessary for the wheel rotational frequency sensor 24, and a sensor having lower resolution than that of the motor rotor angle sensor 36 is used as the wheel rotational frequency sensor 24. However, in the case where the wheel rotational frequency sensor 24 is configured to calculate intervals between pulses and to sense a rotation speed of the wheel, it is possible to improve the resolution of a detected angle by multiplying the pulses, and it is possible to obtain the similar level of resolution as that of the motor rotor angle sensor 36 composed of, for example, a resolver or the like.

In the present invention, when the one motor rotor angle estimator is the wheel speed based motor rotor angle estimator 46, the wheel rotational frequency sensor 24 may be configured to calculate intervals between pulses generated in response to rotation of the wheel and to sense a rotation speed of the wheel In this case, the wheel speed based motor rotor angle estimator 46 may be configured to measure times between pulses produced from the wheel rotational frequency sensor 24 and to estimate an angle of the motor rotor.

Times between pulses are measured instead of multiplication of pulses, and at a timing at which calculation for control based on the position of the magnetic poles, such as field oriented control calculation, is required, an angle can be calculated from the number of pulses from a reference and the time between the pulses. In this case as well, a motor rotor angle can be calculated with high accuracy similarly to the case where pulses are multiplied.

In the present invention, the wheel rotational frequency sensor 24 may be able to detect only a relative angle change by calculating intervals between pulses generated in response to rotation of the wheel and sensing a rotation speed of the wheel. In this case, the sensorless angle estimator 50 may calculate a position of the magnetic poles of the motor rotor after switching to control using the motor rotor angle produced from the wheel speed based motor rotor angle estimator 46 is performed by the sensor switcher 47b, and a motor rotor angle corrector 46d configured to correct a motor rotor angle estimated by the wheel speed based motor rotor angle estimator 46, based on the calculated position of the magnetic poles of the motor rotor may be provided.

When the wheel rotational frequency sensor is configured to measure intervals between pulses corresponding to rotation, the wheel rotational frequency sensor calculates an angle from a value obtained by counting the pulses. In other words, the number of pulses in an electrical angle of 360 degrees is known, and when the position of the magnetic poles is identified once, the rotation angle of the motor rotor is identified from the number of pulses. However, even when a shift has occurred due to influence of noise or low detection capability, this situation cannot be recognized with the wheel rotational frequency sensor. In contrast, it is possible to increase the reliability by periodically amending the position of the magnetic poles with the sensorless angle estimator 50.

In the present invention, the motor unit 6 may be a motor unit 6 in an electric vehicle in which each motor unit 6 is configured to drive a single wheel 2. In this case, the motor unit 6 may be a motor unit 6 which forms a part of an in-wheel motor system 8 mounted adjacent to the wheel 2.

In the case where there are plurality of wheels 2 that are individually motor-driven, when a malfunction of the motor rotor angle sensor 36 occurs during travelling, an imbalance is produced in torque, which may cause a slip or skid. Thus, it is more effective to switch to control based on the angle estimation value from the wheel speed based motor rotor angle estimator 46 or the sensorless angle estimator 50. In addition, in the case of an electric vehicle including a plurality of motor units 6, it is made easy to utilize the start-up rotor angle calculator 102 which uses the above motor counter electromotive force.

The in-wheel motor system 8 may include a wheel bearing unit 4, the motor unit 6, and a reducer unit 7 interposed between the motor unit 6 and the wheel bearing unit 4. In the in-wheel motor system 8 in which the reducer unit 7 is interposed, the motor unit 6 may be rotated at high speed. Thus, it is more effective to perform control using the motor rotor angle estimation value estimated by the wheel speed based motor rotor angle estimator 46 or the sensorless angle estimator 50.

The reducer unit 7 may include a cycloidal reducer. A high reduction ratio may be obtained at the cycloidal reducer through a smooth operation, and the motor unit 6 may be rotated at higher speed due to the high reduction ratio. Thus, it is more effective to perform control using the motor rotor angle estimation value estimated by the wheel speed based motor rotor angle estimator 46 or the sensorless angle estimator 50.

An electric vehicle according to the present invention is an electric vehicle including the motor drive device 20 having any one of the above-describe configurations according to the present invention. Even when a malfunction occurs in the motor rotor angle sensor 36, the electric vehicle is able to travel by control using the motor rotor angle estimation value from the sensorless angle estimator 50 or the wheel speed based motor rotor angle estimator 46 of the motor drive device 20 according to the present invention.

The present invention encompasses any combination of at least two features disclosed in the claims, the specification and/or the drawings. In particular, the present invention encompasses any combination of at least two claims.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, as defined by the appended claims. In the accompanying drawings, like reference numerals are used to denote like parts throughout the several views, and:

FIG. 9 is a block diagram of a schematic configuration of the motor drive device according to the second embodiment of the present invention;

FIG. 10 is a block diagram of a schematic configuration of the motor drive device according to the third embodiment of the present invention;

FIG. 13 is a block diagram of a schematic configuration of the motor drive device according to the fourth embodiment of the present invention;

FIGS. 15A to 15C are explanatory diagrams of a mode of switching to estimation of a motor rotor angle in the motor drive devices according to the fifth to seventh embodiments of the present invention;

FIG. 18 shows a cross section of an example of an in-wheel motor system for an electric vehicle which includes one of the motor drive devices according to the first to seventh embodiments of the present invention;

DESCRIPTION OF EMBODIMENTS

Figure 1:
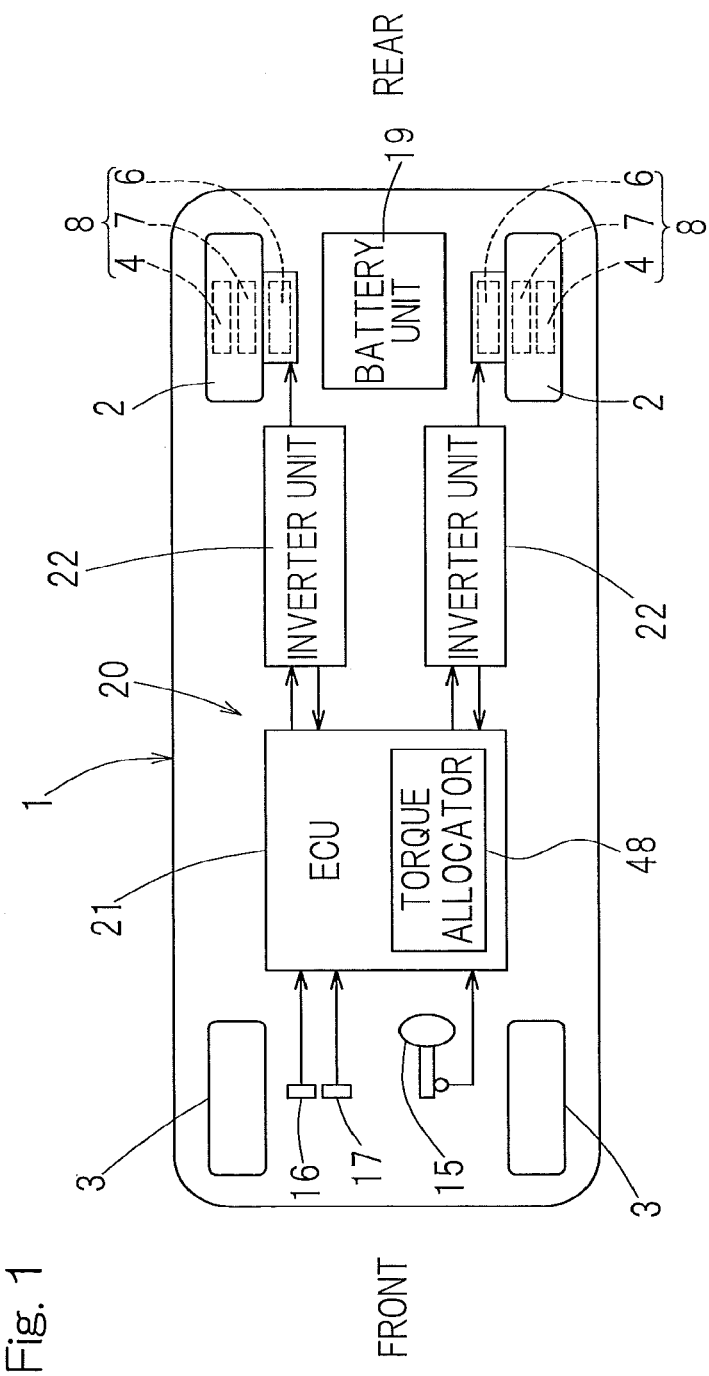
FIG. 1 is a block diagram of a schematic configuration of an electric vehicle, as viewed from top, which includes one of motor drive devices according to first to seventh embodiments of the present invention.

A motor drive device according to a first embodiment of the present invention will now be described in connection with FIG. 1 to FIGS. 8A to 8C. FIG. 1 shows a top view of a schematic configuration of an electric vehicle which includes the motor drive device according to the first embodiment of the present invention. The illustrated electric vehicle is a four-wheel vehicle that includes a vehicle body 1 with left and right rear wheels 2 and left and right front wheels 3, with the rear wheels being drive wheels and the front wheels being driven wheels. The front wheels 3 serve as steered wheels. The left and right drive wheels 2, 2 are driven by respective independent traction motor units 6. Rotation of a motor unit 6 is transmitted via a reducer unit 7 and a wheel bearing unit 4 to a wheel 2. The motor unit 6, the reducer unit 7 and the wheel bearing unit 4 are integrally assembled with each other to form an in-wheel motor system 8. The in-wheel motor system 8 is partly or entirely disposed within the drive wheel 2, thus positioning the motor unit 6 in proximity to the wheel 2. The wheels 2, 3 are equipped with respective electrically driven mechanical brakes (not shown). The term "mechanical" is used in this context to denote that a mechanical brake is different from a regenerative brake. Note that a "mechanical brake" encompasses a hydraulic brake.

A control system of the electric vehicle will be briefly discussed. The illustrated vehicle body 1 is equipped with an ECU 21 which is a primary electronic control unit configured to perform general, integrated control of the vehicle; and a plurality of inverter units 22 (in the illustrated embodiment, two inverter units 22) configured to perform control of the respective traction motor units 6 according to commands from the ECU 21. Such an ECU 21 and the plurality of inverter units 22, 22 may form a motor drive device 20. The ECU 21 may include a computer, programs that may be executed by the computer, and various electronic circuits. A common computer or electrical circuitries on a common substrate may form light current systems for the ECU 21 and each inverter unit 22.

The ECU 21 may include a torque allocator 48 that may be configured to generate an accelerating/decelerating command in the form of a torque command value, which will influence the traction motor units 6, 6 of the left and right wheels, based on a signal indicating accelerator position produced from an accelerator manipulation unit 16, a decelerating signal produced from a brake manipulation unit 17, and a cornering signal produced from a steering unit 15, and to send the accelerating/decelerating command to each inverter unit 22. The torque allocator 48 may be configured to, in response to a decelerating signal produced from the brake manipulation unit 17, generate a braking torque command allocated to regenerative braking of the motor unit 6 and a braking torque command allocated to the operation of the mechanical brakes (not shown). Such a braking torque command allocated to regenerative braking may be reflected in a torque command value that serves as the aforementioned accelerating/decelerating command that may influence the corresponding traction motor unit(s) 6, 6. The accelerator manipulation unit 16 may include a pedal such as an accelerator pedal and a pedal sensor configured to sense the depression of the accelerator pedal. The brake manipulation unit 17 may include a pedal such as a brake pedal and a pedal sensor configured to sense the depression of the brake pedal. The steering unit 15 may include a steering wheel and a steering angle sensor configured to sense the rotational angle of the steering wheel. The vehicle body 1 is also equipped with a battery unit 19 that may serve as a power source that powers the driving of the motor units 6, 6 and the entire electrical system of the vehicle.

Figure 2:
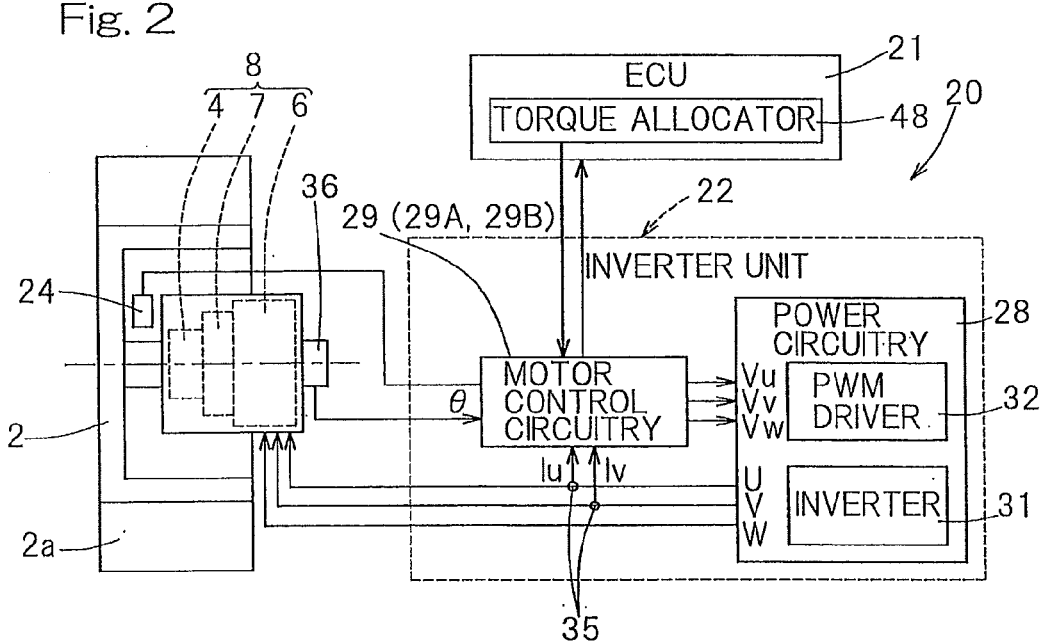
FIG. 2 is a block diagram of a schematic configuration of an inverter unit for the electric vehicle.

As shown in FIG. 2, the inverter unit 22 includes a power circuitry 28 serving as a power converter circuitry, which may be provided one for each motor unit 6, and a motor control circuitry 29 configured to control the power circuitry/circuitries 28. The motor control circuitry 29 may be configured to send various information related to the in-wheel motor system 8 (FIG. 1) corresponding to the motor control circuitry 29, such as a variety of detection values or various control values, to the ECU 21.

The power circuitry 28 includes an inverter 31 configured to convert a DC power from the battery unit 19 (FIG. 1) into a three-phase AC power used to drive the motor unit 6 and also includes a PWM driver 32 configured to control the inverter 31.

Figure 3:
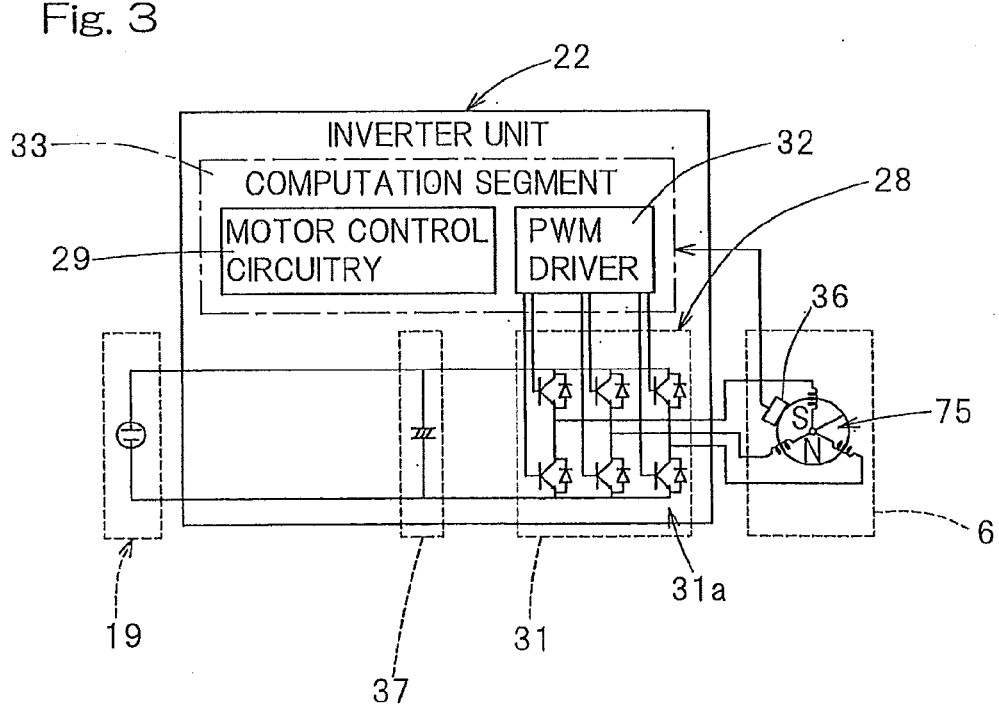
FIG. 3 is a circuit diagram of the inverter unit.
Figure 4:
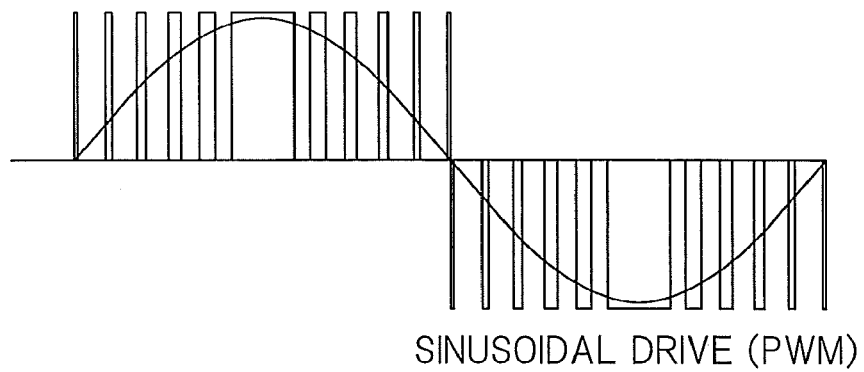
FIG. 4 shows an explanatory diagram of an output waveform of the inverter unit.

The motor unit 6 such as shown in FIG. 3 may include a three-phase synchronous motor such as an IPM (Interior Permanent Magnet) synchronous motor. The inverter 31 may include a plurality of drive devices 31a serving as semiconductor switching devices and may be configured to produce drive current pulses for the corresponding three phases (U phase, V phase and W phase) of the motor unit 6. The PWM driver 32 may be configured to perform pulse width modulation on a received current command by generating ON/OFF commands to the drive devices 31a. The pulse width modulation may be performed to produce a current output that provides sinusoidal drive such as shown in FIG. 4. In FIG. 3, the motor control circuitry 29, together with the PWM driver 32 that may serve as a light current circuit segment in the power circuitry 28, may form a computation segment 33 that serves as a light current circuit segment in the inverter unit 22. The computation segment 33 may include a computer, programs that may be executed by the computer, and electronic circuits. A smoothing segment 37, which may include a smoothing capacitor, may also be provided in the inverter unit 22 so as to be interposed in parallel between the battery unit 19 and the inverter 31.

The motor unit 6 may include a motor rotor angle sensor 36 that may be configured to sense an angle of a motor rotor 75 of the motor unit 6. The motor rotor angle sensor 36 may include a highly precise sensor device such as a resolver. As shown in FIG. 2, the wheel bearing unit 4 or a support structure such as a knuckle (not shown) that supports the wheel bearing unit 4 may include a wheel rotational frequency sensor 24 configured to sense rotation of the wheel 2. The wheel rotational frequency sensor 24 may be referred to as an ABS sensor, since it is used in an anti-lock-braking system (not shown). The wheel rotational frequency sensor 24 is a sensor having lower resolution than that of the motor rotor angle sensor 36.

Figure 5:
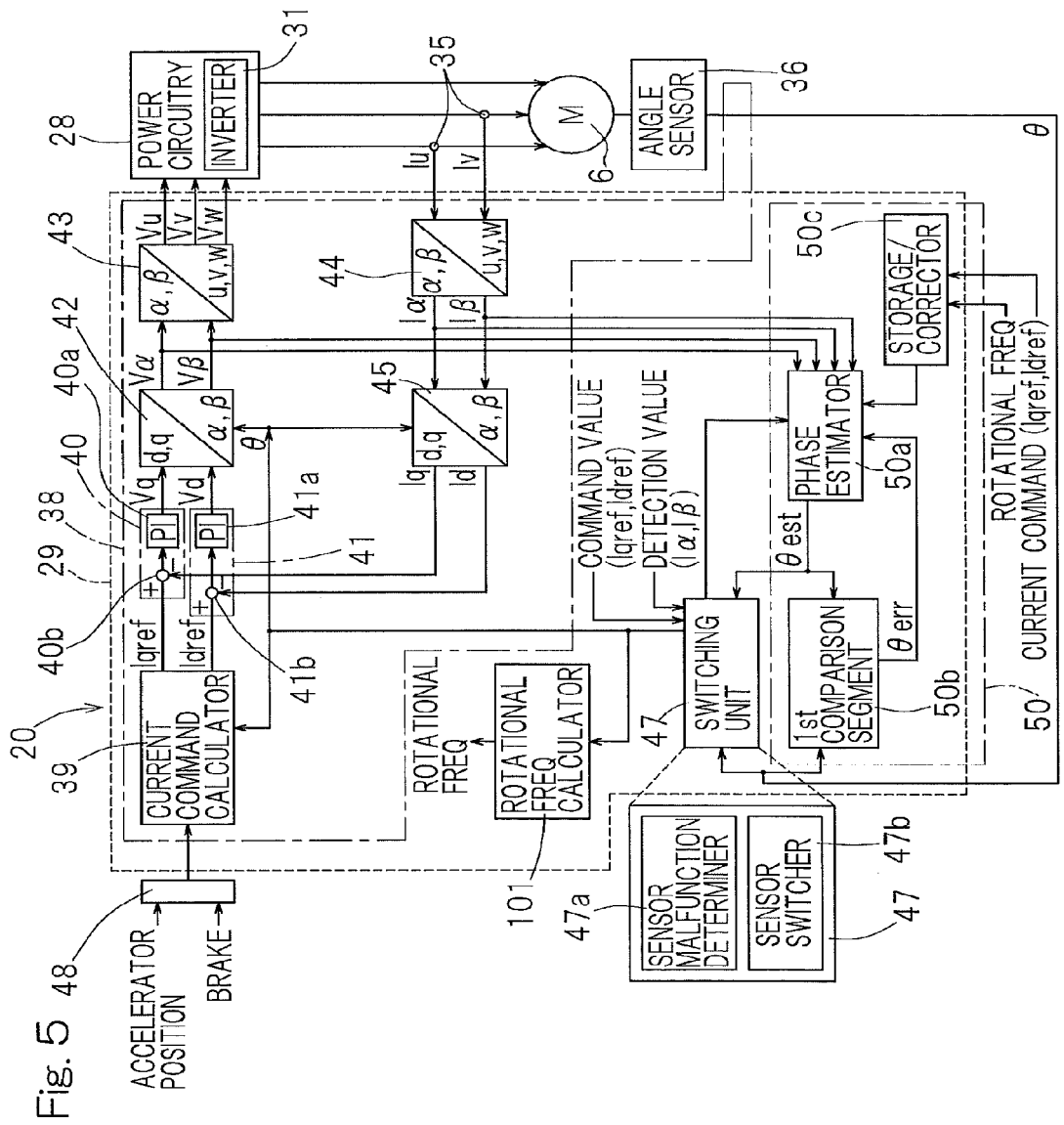
FIG. 5 is a block diagram of a schematic configuration of the motor drive device according to the first embodiment of the present invention.
Figure 6:
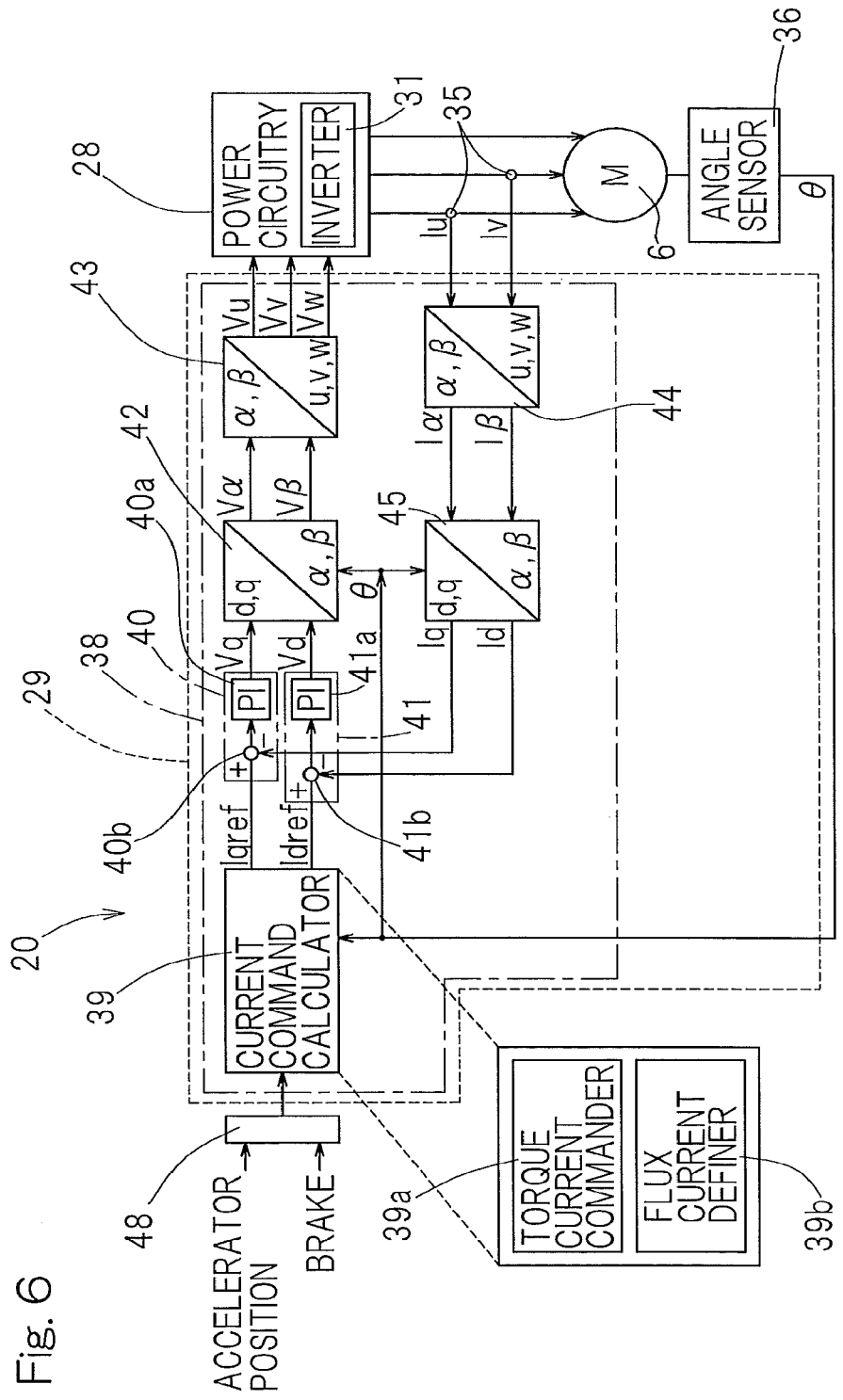
FIG. 6 is a block diagram of a schematic configuration of a general drive controller in the motor drive devices according to the first to seventh embodiments of the present invention.

The motor control circuitry 29 of the inverter unit 22 in FIGS. 2 and 3 has a configuration shown in FIG. 5. The motor control circuitry 29 may include a general drive controller 38. The general drive controller 38 may be configured to perform control based on the position of magnetic poles. The position of magnetic poles may be determined with a detection value indicating an angle produced from the motor rotor angle sensor 36 that may be provided in the motor unit 6. The motor control circuitry 29 may perform field oriented control. Field oriented control is a control scheme that may use a torque current and a magnetic flux current and may control the torque current and the magnetic flux current independently of each other to provide control with quicker response and improved accuracy. FIG. 6 is a diagram focusing on the general drive controller 38, wherein components unnecessary for the explanation among the components shown in FIG. 5 are omitted.

Referring to FIG. 6, the general drive controller 38 may include a current command values calculator 39, a torque current controller 40, a magnetic flux current controller 41, an α, β coordinate converter 42, a two-to-three phase coordinate converter 43, a three-to-two phase coordinate converter 44 and a rotating coordinate converter 45. Both the converters 44 and 45 provided at a detection side.

The current command values calculator 39 may include a torque current commander 39a and a magnetic flux current definer 39b, as illustrated in FIG. 6 by a block showing its internal configuration. The torque commander 39a may be configured to produce a torque current command value Iqref, based on a torque command value that may be produced from a higher-level unit. Such a higher-level unit may be the ECU 21 in FIG. 1. In a configuration where the ECU 21 includes the torque allocator 48 as shown in FIG. 1, such a higher-level unit may be the torque allocator 48 as shown in FIG. 6. The torque command value that may be produced from a higher-level unit may be a torque current command value Iqref calculated based on the accelerator position, a braking command for the brake, and the like. The magnetic flux current definer 39b may be configured to produce a predetermined magnetic flux current command value Idref. Such a magnetic flux current command value Idref can be appropriately defined according to, for example, characteristics of the motor unit 6. In general, such a magnetic flux current command value Idref may be defined as "zero." A torque current may hereinafter be referred to as a "q-axis current." A magnetic flux current may hereinafter be referred to as a "d-axis current." Similarly, a torque voltage may be hereinafter referred to as a "q-axis voltage." A magnetic flux voltage may hereinafter be referred to as a "d-axis voltage." A q-axis is an axis defining a rotational direction of the motor unit, and a d-axis is an axis defining a direction perpendicular to the q-axis. A magnetic flux current may be referred to also as an excitation current.

The torque current controller 40 may be configured to receive a q-axis current command value Iqref from the torque current commander 39a of the current command values calculator 39 and to perform control that causes a q-axis current detection value Iq to follow the received q-axis current command value Iqref. The q-axis current detection value Iq may be obtained in the following manner. A current sensor 35 may be configured to sense drive current(s) of the motor unit 6 (currents of two phases or three phases as described later) and to produce sensing value(s), and the corresponding sensing value may be processed by the three-to-two phase coordinate converter 44 and the rotating coordinate converter 45 to determine the q-axis current detection value Iq. The torque current controller 40 may be configured to produce a q-axis voltage command value Vq as an output.

The torque current controller 40 may include a calculator 40a and a subtractor 40b. The subtractor 40b may be configured to subtract the q-axis current detection value Iq from the q-axis current command value Iqref. The calculator 40a may be configured to perform a certain computation on the output of the subtractor 40b. In the example under discussion, the calculator 40a may perform a proportional integration on the output of the subtractor 40b.

The magnetic flux current controller 41 may be configured to receive a d-axis current command value Idref from the magnetic flux current definer 39b of the current command values calculator 39 and to perform control that causes a d-axis current detection value Id to follow the received d-axis current command value Idref. The d-axis current detection value Id may be obtained in the following manner. A current sensor 35 may be configured to sense drive current(s) of the motor unit 6 (currents of two phases or three phases as described later) and to produce sensing value(s), and the corresponding sensing value may be processed by the three-to-two phase coordinate converter 44 and the rotating coordinate converter 45 to determine the d-axis current detection value Id. The magnetic flux current controller 41 may be configured to produce a d-axis voltage command value Vd as an output.

The magnetic flux current controller 41 may include a calculator 41a and a subtractor 41b. The subtractor 41b may be configured to subtract the d-axis current detection value Id from the d-axis current command value Idref. The calculator 41a may be configured to perform a certain computation on the output of the subtractor 41b. In the example under discussion, the calculator 41a may perform a proportional integration on the output of the subtractor 41b.

The three-to-two phase coordinate converter 44 may be configured to convert the sensing values of two or three of U phase, V phase and W phase currents of the motor unit 6 (e.g., sensing values of the U phase current Iu and V phase current Iv) into detection values Iα, Iβ indicating the respective actual currents of static two-phase orthogonal coordinate components (i.e., an actual current along an α-axis and an actual current along a β-axis).

The rotating coordinate converter 45 may be configured to, based on the angle θ of the motor rotor as sensed by the motor rotor angle sensor 36, convert the aforementioned detection values Iα, Iβ indicating the respective actual currents of the static two-phase orthogonal coordinate components, into the q-axis and d-axis current detection values Iq, Id.

The α, β coordinate converter 42 may be configured to, based on the angle θ of the motor rotor as sensed by the motor rotor angle sensor 36 (i.e., the phase of the motor rotor), convert the q-axis voltage command value Vq and the d-axis voltage command value Vd into the respective actual voltage command values Vα, Vβ of fixed two-phase coordinate components.

The two-to-three phase coordinate converter 43 may be configured to convert the actual voltage command values Vα, Vβ produced from the α, β coordinate converter 42 into three-phase AC voltage command values Vu, Vv, Vw to control the corresponding U, V and W phases of the motor unit 6.

The power circuitry 28 may receive the voltage command values Vu, Vv, Vw produced from the two-to-three phase coordinate converter 43 in the general drive controller 38 and perform power conversion of the received voltage command values Vu, Vv, Vw to produce drive currents Iu, Iv, Iw of the motor unit.

The motor drive device 20 according to the first embodiment may include the general drive controller 38 having the above configuration, and may further include a sensorless angle estimator (first motor rotor angle estimator) 50 and a sensor malfunction determination sensor switching unit 47 as shown in FIG. 5. The sensorless angle estimator 50 may be configured to estimate an angle of the motor rotor without using a rotation sensor, and may include a phase estimator 50a, a first comparison segment 50b, and a correction value storage/corrector 50c. The sensor malfunction determination sensor switching unit 47 may include a sensor malfunction determiner 47a that may be configured to determine a malfunction of the motor rotor angle sensor 36; and a sensor switcher 47b that may be configured to cause the general drive controller 38 to perform control using an estimation value indicating a motor rotor angle produced from the sensorless angle estimator 50 instead of the angle detection value sensed by the motor rotor angle sensor 36, when the sensor malfunction determiner 47a determines that the motor rotor angle sensor 36 malfunctions.

Figure 7:
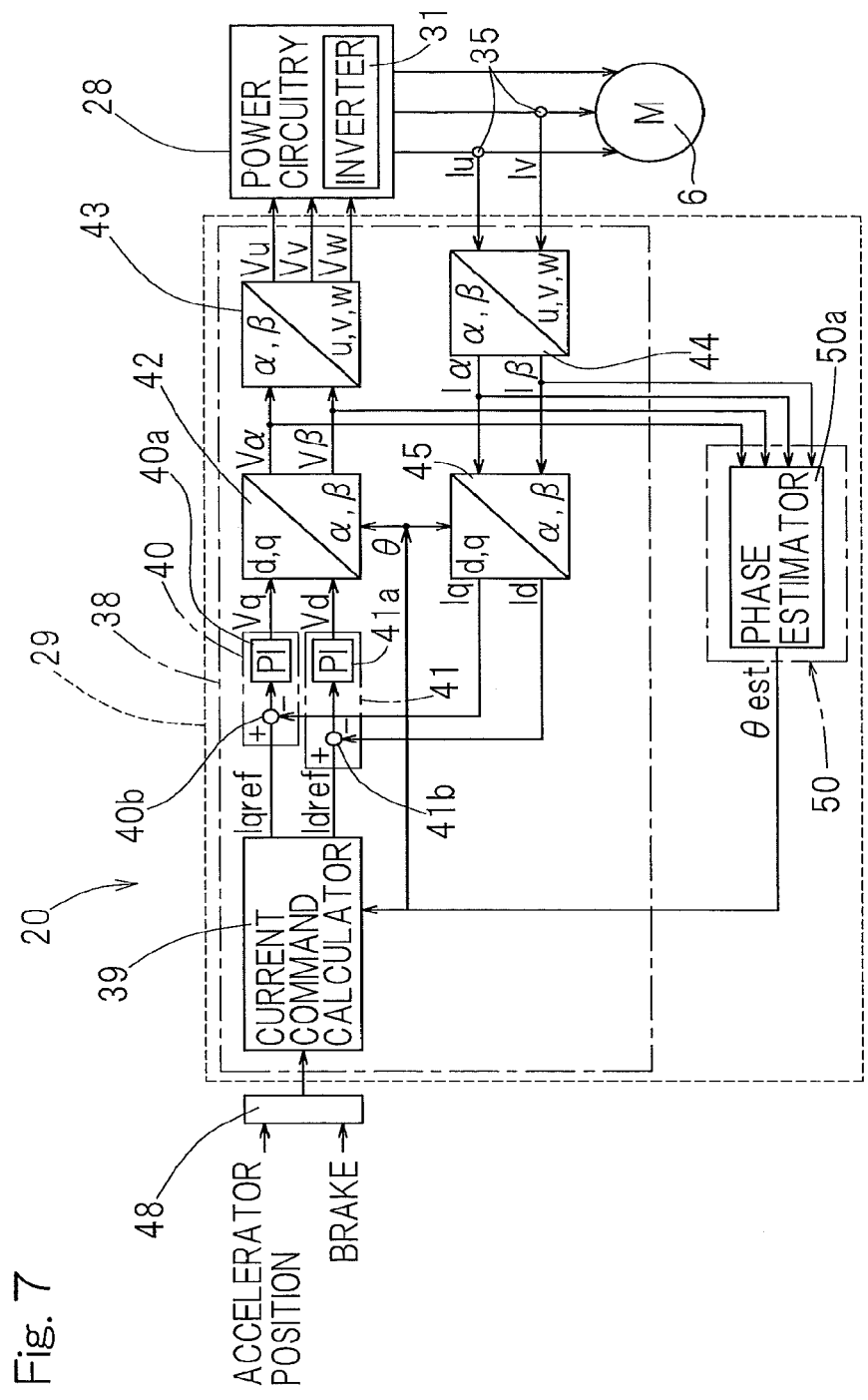
FIG. 7 is a block diagram of a schematic configuration showing an operating state when a sensorless angle estimator in the motor drive devices according to the first, second, and fifth to seventh embodiments of the present invention is used.

FIG. 7 shows a situation in which control is performed using the motor rotor angle produced from the sensorless angle estimator 50. In FIG. 7, for easy understanding, among the components in FIG. 5, only each component used when control is performed using the motor rotor angle produced from the sensorless angle estimator 50 is illustrated, and the other components are omitted.

In FIG. 5, the sensor malfunction determiner 47a may be configured to determine whether the motor rotor angle sensor 36 malfunctions, for example, based on an amount of change in the angle detection value θ from the motor rotor angle sensor 36 for a given time period. Normally, an amount of change in an angle detection value θ from the motor rotor angle sensor 36 for the given time period falls within a range that is fixed to some extent. Thus, when the amount of change is extremely large, it is thought that the motor rotor angle sensor 36 malfunctions. In view of this, an appropriate threshold or range may be defined, and when the above amount of change exceeds the threshold or the range, it may be determined as a malfunction. The "given time period" may be appropriately defined.

The sensor malfunction determiner 47a may be configured to determine whether a malfunction has occurred, based on the difference between a command value supplied to the motor unit and a detection value in the motor unit. The command value to be compared may be, for example, the motor current command Iqref or Idref produced from the current command values calculator 39. The detection value to be compared may be a value obtained by coordinate conversion into a q-axis current or a d-axis current that is the same in axis as the motor current command. In other words, the sensor malfunction determiner 47a may be configured to determine whether a malfunction has occurred, based on the difference between the torque current command value Iqref which is a command value supplied to the motor unit and the torque current detection value Iq which is a detection value in the motor unit or the difference between the magnetic flux current command value Idref which is a command value supplied to the motor unit and the magnetic flux current detection value Id which is a detection value in the motor unit. Normally, a difference between a motor current command value and a motor current detection value which is an actually flowing current, that is, a difference between the torque current command value Iqref and the torque current detection value Iq as well as a difference between the magnetic flux current command value Idref and the magnetic flux current detection value Id, fall within a range that is fixed to some extent. Thus, an appropriate threshold or like may be defined for each of these differences, and when any one of the differences exceeds the threshold, it may be determined as a malfunction. In this case, an accelerator operation may be monitored, and it may be determined whether the motor current command value greatly changes as a result of an accelerator operation, that is, whether any one of the torque current command value Iqref and the magnetic flux current command value Idref greatly changes. Each of the command value supplied to the motor unit and the detection value in the motor unit may be a value obtained by α, β coordinate conversion performed by the α, β coordinate converter 42. In other words, it may be determined whether a malfunction has occurred, based on any one of the difference between the α component of the current command value corresponding to the motor voltage command value Vα and the α component of the motor current detection value Iα and the difference between the β component of the current command value corresponding to the motor voltage command value Vβ and the β component of the motor current detection values Iβ.

Furthermore, the sensor malfunction determiner 47a may be configured to perform a determination based on both the above amount of change in the angle detection value θ and the differences between the command values Vα, Vβ (Iqref, Idref) supplied to the motor unit and the detection values Iα, Iβ (Iq, Id) in the motor unit. When the determination is performed using both, even if each of the thresholds is defined so as to be low, a reliable malfunction determination can be performed, and a malfunction determination can be performed at an early stage.

When the sensor malfunction determiner 47a determines that the motor rotor angle sensor 36 malfunctions, the sensor switcher 47b may input an estimation value θest of the motor rotor angle produced from the phase estimator 50a of the sensorless angle estimator 50 to the current command values calculator 39, the α, β coordinate converter 42, and the rotating coordinate converter 45, instead of the detection value θ of the motor rotor angle sensor 36.

While the motor unit is driven with the motor rotor angle detection value θ being used by the general drive controller 38, the sensorless angle estimator 50 may constantly perform an operation of estimating an angle of the motor rotor and may correct an estimation value of the motor rotor angle such that the estimation value of the motor rotor angle agrees with or gets close to the angle detection value of the motor rotor angle sensor 36. In the first embodiment, the sensorless angle estimator 50 may include the phase estimator 50a, the first comparison segment 50b, and the correction value storage/corrector 50c.

For example, based on a motor equivalent circuit equation:

$$V = RI + L\frac{d}{dt}I + K_E \omega \qquad \text{[Math. 1]}$$

the following equation is obtained in a d-q coordinate system.

$$\begin{pmatrix} Vd \\ Vq \end{pmatrix} = R\begin{pmatrix} Id \\ Iq \end{pmatrix} + \begin{pmatrix} L_d \frac{d}{dt} & -\omega L_q \\ \omega L_d & L_q \frac{d}{dt} \end{pmatrix}\begin{pmatrix} Id \\ Iq \end{pmatrix} + K_E \omega \begin{pmatrix} 0 \\ 1 \end{pmatrix}$$

Furthermore, when this equation is converted into an α-β coordinate system, the following equation is obtained.

$$\begin{pmatrix} V\alpha \\ V\beta \end{pmatrix} = R\begin{pmatrix} I\alpha \\ I\beta \end{pmatrix} +$$

$$\frac{d}{dt}\begin{pmatrix} \frac{1}{2}(L_d+L_q)+\frac{1}{2}(L_d-L_q)\cos2\theta & \frac{1}{2}(L_d-L_q)\sin2\theta \\ \frac{1}{2}(L_d-L_q)\sin2\theta & \frac{1}{2}(L_d+L_q)-\frac{1}{2}(L_d+L_q)\cos2\theta \end{pmatrix}$$

$$\begin{pmatrix} I\alpha \\ I\beta \end{pmatrix}+K_E\omega\begin{pmatrix} -\sin\theta \\ \cos\theta \end{pmatrix}$$

Here, when the above equation is represented using Iq, the following equation is obtained.

$$\begin{pmatrix} V\alpha \\ V\beta \end{pmatrix}=R\begin{pmatrix} I\alpha \\ I\beta \end{pmatrix}+\begin{pmatrix} L_d\frac{d}{dt} & 0 \\ 0 & L_q\frac{d}{dt} \end{pmatrix}\begin{pmatrix} I\alpha \\ I\beta \end{pmatrix}-\{s(L_d-L_q)I_q+K_E\omega\}\begin{pmatrix} -\sin\theta \\ \cos\theta \end{pmatrix}$$

The phase estimator 50a may perform estimation of an angle (phase) of the motor rotor based on the above equation.

Here, R denotes an armature wire-wound resistance value, $L_d$ denotes a d-axis inductance, $L_q$ denotes a q-axis inductance, and $K_E$ denotes an induced voltage constant. R, $L_d$, $L_q$, and $K_E$ are known. Iα, Iβ are detection values and Vα, Vβ are values calculated at the time of field oriented control. Those defined values and detected and calculated values are known at the time of position estimation. Thus, estimation of an angle (phase) of the motor rotor is possible.

In addition, a calculation may be performed based on the motor equivalent circuit equation in the d-q coordinate system to obtain a speed, and the speed may be integrated to estimate an angle (phase) of the motor rotor. While the motor unit 6 is driven by the general drive controller 38 performing control using the angle detection value θ of the motor rotor, the phase estimator 50a may constantly perform an operation of estimating an angle of the motor rotor.

The first comparison segment 50b may compare the estimation value θest of the motor rotor angle produced from the phase estimator 50a with the angle detection value θ of the motor rotor angle sensor 36 and may produce, as an output, an error θerr that is a result of the comparison.

The correction value storage/corrector 50c may determine an adjusted value a value to be adjusted of each parameter for the motor unit or an offset value for adding an offset directly to the motor rotor angle estimation value, such that the error θerr, which is the output of the first comparison segment 50b, is minimized, and may store the adjusted value of each parameter or the offset value. It is to be noted that the parameter adjusted value and the offset value are correspond to correction values. The correction value storage/corrector 50c may store any one of or both a rotational frequency obtained from the motor rotor angle sensor 36 and a motor current command value generated by the general drive controller 38 (the torque current command value Iqref and/or the magnetic flux current command value Idref), and may store the correction value with respect to the any one of or both the rotational frequency and the motor current command value. The correction value storage/corrector 50c may determine a correction process (a relational expression for a correction) according to a specified rule from any one of or both a rotational frequency obtained from the wheel rotational frequency sensor 24 (FIG. 2) or a later-described rotational frequency calculator 101 and the motor current command value generated by the general drive controller 38 (the torque current command value Iqref and/or the magnetic flux current command value Idref), and may correct the motor rotor angle θest produced from the phase estimator 50a, based on the stored correction value. Specifically, the correction value storage/corrector 50c may correct a relationship between the angle of the motor rotor and the motor current detection values Iα, Iβ (the detection values Iα, Iβ indicating the respective actual currents of the static two-phase orthogonal coordinate components) stored in the phase estimator 50a for performing estimation of a motor rotor angle, or a relationship between the angle of the motor rotor and a result of the comparison between the motor current detection values Iα, Iβ and the motor voltage command values Vα, Vβ (the actual voltage command values Vα, Vβ of the fixed two-phase coordinate components).

It is to be noted that in addition to the above components, the motor control circuitry 29 may include a rotational frequency calculator 101 that may be configured to calculate a rotational frequency of the motor unit from the estimation value θest of the motor rotor angle produced from the phase estimator 50a, and to output the calculated rotational frequency.

The correction value to be stored in the correction value storage/corrector 50c may be determined based on the output of the wheel rotational frequency sensor 24 or the output of the rotational frequency calculator 101. Particularly, when the wheel rotational frequency sensor 24 is not provided, the calculation result of the rotational frequency calculator 101 may be used. When a rotation sensor is not used, there is the possibility that an error occurs in estimation of an absolute angle, but the accuracy of estimation of a rotational frequency is high, and thus there is no problem about use of an output of rotational frequency calculation that does not use a rotation sensor.

In the motor drive device 20 according to the first embodiment, in a state where the motor rotor angle sensor 36 is normal, control based on the position of the magnetic poles may be performed by the general drive controller 38 in accordance with the angle detection value of the motor rotor angle sensor 36 as shown in FIG. 6, and efficient motor driving may be performed. A malfunction of the motor rotor angle sensor 36 may be monitored and determined by the sensor malfunction determiner 47a in FIG. 5. The malfunction determination by the sensor malfunction determiner 47a may be performed including a wiring system of the motor rotor angle sensor 36, or for only the motor rotor angle sensor 36.

Figure 8A:
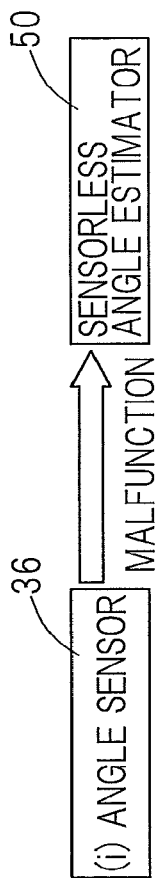
FIGS. 8A to 8C are explanatory diagrams showing a situation in switching to sensorless angle estimation of a motor rotor angle in the motor drive devices according to the first and second embodiments of the present invention.

When it is determined as a malfunction by the sensor malfunction determiner 47a, the sensor switcher 47b may cause the general drive controller 38 to perform control using the motor rotor angle (the estimation value θest of the motor rotor angle) produced from the sensorless angle estimator 50 as shown in FIGS. 7 and 8A, instead of the angle detection value sensed by the motor rotor angle sensor 36. In other words, the sensor switcher 47b may input the estimation value θest of the motor rotor angle estimated by the phase estimator 50a of the sensorless angle estimator 50 to the current command values calculator 39, the α, β coordinate converter 42, and the rotating coordinate converter 45. Thus, even when a malfunction occurs in the motor rotor angle sensor 36, control based on the position of the magnetic poles can be performed by the general drive controller 38.

Thus, even when a malfunction occurs in the motor rotor angle sensor 36 during travelling, the travelling can be continued. In the case of an electric vehicle of an in-wheel motor type or the like including the motor units 6 that may be configured to individually drive the respective wheels 2, even when a malfunction occurs in one of the motor rotor angle sensors 36 during travelling, production of an imbalance in torque can be avoided, and occurrence of a slip or skid can be prevented. The motor rotor angle produced from the sensorless angle estimator 50 is insufficient in accuracy or reliability as compared to the angle detection value sensed by the motor rotor angle sensor 36 in some cases, but self-travelling is enabled to a place for vehicle repair such as a repair shop, or to a safe evacuation place at a roadside.

Each motor unit 6 driven by the motor drive device 20 according to the first embodiment forms a part of the in-wheel motor system 8 including the reducer unit 7 as shown in FIG. 1. When the reducer unit 7 is interposed, the motor unit 6 may be rotated at high speed. Thus, it is more effective to perform control using the estimation value of the motor rotor angle estimated by the sensorless angle estimator 50. In particular, when the reducer unit 7 includes a cycloidal reducer, a high reduction ratio may be obtained through a smooth operation, and the motor unit 6 may be rotated at higher speed due to the high reduction ratio. Thus, it is more effective to perform control using the estimation value of the motor rotor angle estimated by the sensorless angle estimator 50.

Figure 8B:
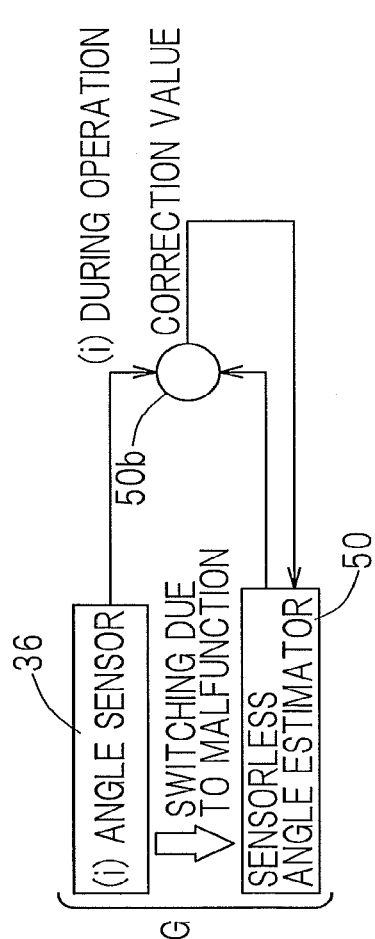

While the motor unit is driven with the angle detection value θ of the motor rotor angle sensor 36 being used by the general drive controller 38, the sensorless angle estimator 50 in FIG. 5 may constantly perform an operation of estimating an angle of the motor rotor, may compare an estimation value of the motor rotor angle with the angle detection value of the motor rotor angle sensor 36, and may correct the estimation value of the motor rotor angle, as shown in FIG. 8B. Since the angle estimation value of the sensorless angle estimator 50 (FIG. 5) has been corrected with the angle detection value of the motor rotor angle sensor 36 while the motor rotor angle sensor 36 is normal as described above, sensorless angle estimation is enabled with high accuracy. Regarding the above "constantly . . . correct . . . ", comparison and correction may not necessarily be performed all the time, and correction may be periodically performed.

Figure 8C:
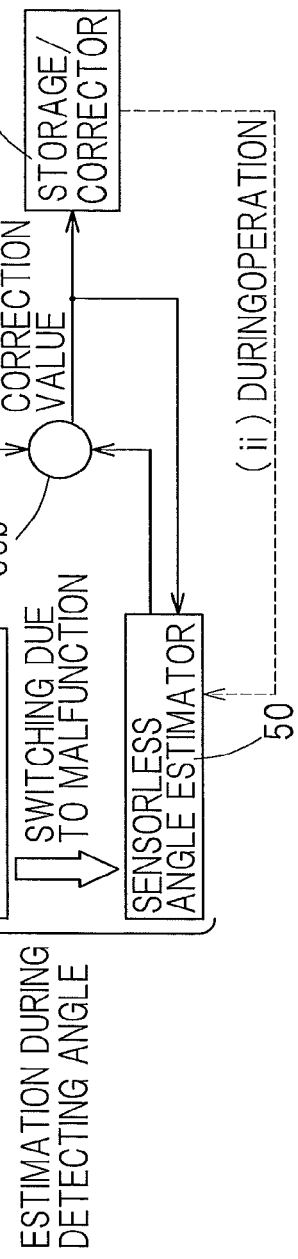

The sensorless angle estimator 50 in FIG. 5 may include the phase estimator 50a, the first comparison segment 50b which may compare the estimation value produced from the phase estimator 50a with the angle detection value θ of the motor rotor angle sensor 36, and the correction value storage/corrector 50c as described above. The correction value storage/corrector 50c may calculate the adjusted value of each parameter for the motor unit or the offset value for adding an offset to the motor rotor angle, such that the adjusted value of each parameter or the offset value minimizes the error θerr, based on the comparison result of the first comparison segment 50b, and may store the adjusted value of each parameter or the offset value (FIG. 8C). The correction value storage/corrector 50c may correct the estimated motor rotor angle using the stored correction value (the adjusted value of each parameter and/or the offset value), and the estimated motor rotor angle may be used for driving by the general drive controller 38 when the motor rotor angle sensor 36 malfunctions. Specifically, the correction value storage/corrector 50c may determine a correction process based on the stored correction value according to any one of or both the rotational frequency obtained from the wheel rotational frequency sensor 24 or the rotational frequency calculator 101 and the current command value generated by the general drive controller 38, and may perform the correction process. Thus, sensorless angle estimation is enabled with high accuracy.

FIG. 9 shows a motor control circuitry 29 in a motor drive device 20 according to a second embodiment of the present invention and components associated with the motor control circuitry 29. In the second embodiment, a start-up rotor angle calculator 102 may be further provided in the motor drive device according to the first embodiment shown in FIG. 1 to FIGS. 8A to 8C. In a state where it is determined as a malfunction by the sensor malfunction determiner 47a, when the motor unit 6 is started up after stop of the motor unit 6, the start-up rotor angle calculator 102 may calculate an angle of the motor rotor from a counter electromotive voltage of the motor unit 6 and may cause the general drive controller 38 to perform control using the calculated angle. The counter electromotive voltage of the motor unit 6 may be sensed with a voltage sensor 103 provided on a wire between the inverter 31 and the motor unit 6. The motor rotor angle calculated by the start-up rotor angle calculator 102 may be inputted to the current command values calculator 39, the α, β coordinate converter 42, and the rotating coordinate converter 45 instead of the output estimated by the sensorless angle estimator 50 and the detection value of the motor rotor angle sensor 36.

It is to be noted that the general drive controller 38 may be controlled with the angle calculated by the start-up rotor angle calculator 102, for a determined time period or up to a rotation angle for one cycle in electrical angle of the motor unit at the time of start-up. Thereafter, the output estimated by the sensorless angle estimator 50 may be used. In addition, the ECU 21 may be configured to supply a torque command from the torque allocator 48 (FIG. 1) or the like to the inverter unit 22 for each motor unit 6 even after travelling is stopped in a state where it is determined as a malfunction by the sensor malfunction determiner 47a.

In the motor drive device according to the second embodiment, the following advantages are obtained. Since the general drive controller 38 may perform control based on the position of the magnetic poles in accordance with the angle detection value, the general drive controller 38 cannot start up the motor unit 6 if the angle is unknown. The sensorless angle estimator 50 also cannot work at the time of start-up after stop. Thus, when the motor unit 6 is stopped, the motor unit 6 cannot be started up immediately. However, in an electric vehicle including two or more motor units 6, travelling is enabled to some extent with the operable motor unit(s) 6. When travelling is performed, the motor unit 6 in which a sensor malfunction has occurred is rotated by rotation of the corresponding wheel 2. By detecting a counter electromotive force of the motor unit 6 at that time, it is possible to detect the position of the magnetic poles. It is possible to detect the position of the magnetic poles in one rotation in electrical angle. Thus, for example, at the time when a tire 2a rotates by a fraction of one rotation, it is made possible to sense an angle based on the counter electromotive force, and the motor unit 6 can be driven. The other configuration and advantageous effects in the second embodiment are the same as those in the first embodiment.

FIG. 10 shows a motor control circuitry 29A in a motor drive device 20 according to a third embodiment of the present invention and components associated with the motor control circuitry 29A. The motor drive device 20 according to the third embodiment may have the same configuration as that of the motor drive device 20 according to the first embodiment, except for the motor control circuitry 29A, and the configuration described with reference to FIGS. 1 to 4 can be applied thereto as it is. In the description of the present embodiment, parts that are the same as or correspond to those in the motor drive device according to the first or second embodiment are designated by the same reference numerals, and the detailed description thereof is omitted.

The motor control circuitry 29A of the motor drive device 20 according to the third embodiment as shown in FIG. 10 may include a general drive controller 38 having the same configuration as those of the motor control circuitries 29 of the motor drive devices 20 according to the first and second embodiments. On the other hand, the motor control circuitry 29A of the motor drive device 20 according to the third embodiment may not include the sensorless angle estimator 50 (first motor rotor angle estimator) (FIG. 5, FIG. 9) of each of the motor drive devices 20 according to the first and second embodiments, but may include a wheel speed based motor rotor angle estimator (second motor rotor angle estimator) 46 instead. In addition, the motor control circuitry 29A may include a sensor malfunction determination sensor switching unit 47 similarly to the first and second embodiments.

The wheel speed based motor rotor angle estimator 46 may be configured to estimate an angle of the motor rotor from a detection signal of the wheel rotational frequency sensor 24 configured to sense a rotation speed of the wheel driven by the motor unit 6.

The sensor malfunction determination sensor switching unit 47 is as described in connection with the first embodiment. In the motor drive device 20 according to the third embodiment, when the sensor malfunction determiner 47a determines that the motor rotor angle sensor 36 malfunctions, the sensor switcher 47b may cause the general drive controller 38 to perform control using a motor rotor angle produced from the wheel speed based motor rotor angle estimator 46 instead of the angle detection value sensed by the motor rotor angle sensor 36. In other words, when the sensor malfunction determiner 47a determines that the motor rotor angle sensor 36 malfunctions, the sensor switcher 47b may input the estimation value of the motor rotor angle produced from the wheel speed based motor rotor angle estimator 46 to the current command values calculator 39, the $\alpha$, $\beta$ coordinate converter 42, and the rotating coordinate converter 45 instead of the detection value $\theta$ of the motor rotor angle sensor 36.

Specifically, for example, the wheel speed based motor rotor angle estimator 46 may be configured as follows. The case where the wheel rotational frequency sensor 24 calculates intervals between pulses generated in response to rotation of the wheel and senses a rotation speed of the wheel, that is, it is able to sense only a relative angle change, will be described. In this case, the wheel speed based motor rotor angle estimator 46 may be configured to estimate an angle of the motor rotor from the detection signal of the wheel rotational frequency sensor 24 when: a relationship between the angle detection value $\theta$ of the motor rotor angle sensor 36 and the detection signal of the wheel rotational frequency sensor 24 is determined during motor rotation (while the motor rotor angle sensor 36 is normal); the position of the magnetic poles of the motor rotor relative to the detection signal of the wheel rotational frequency sensor 24 is obtained; and switching is performed by the sensor switcher 47b such that the motor rotor angle produced from the wheel speed based motor rotor angle estimator 46 is used.

More specifically, the wheel speed based motor rotor angle estimator 46 may include a magnetic pole position relationship storage 46a that may be configured to obtain the position of the magnetic poles relative to the detection signal of the wheel rotational frequency sensor 24 based on the angle detection value of the motor rotor angle sensor 36 while the sensor malfunction determiner 47a determines that the motor rotor angle sensor 36 is normal, and to store a correlation between the wheel rotational frequency and the position of the magnetic poles, that is, a positional relationship therebetween. The magnetic pole position relationship storage 46a may be configured to be able to retain its memory even while the power is off. In addition, in the configuration with the magnetic pole position relationship storage 46a, in order to be able to identify the position of the magnetic poles even when the wheel is rotated by an external factor in a state where the power is off, the wheel rotational frequency sensor 24 and the wheel speed based motor rotor angle estimator 46 are desirably configured to start operating when sensing rotation of the wheel even while the power is off.

The wheel speed based motor rotor angle estimator 46 may include a second comparison segment 46c (illustrated in the drawing by a block different from that of the wheel speed based motor rotor angle estimator 46). While the sensor malfunction determiner 47a determines that the motor rotor angle sensor 36 is normal, the motor rotor angle estimation value estimated by the wheel speed based motor rotor angle estimator 46 may be compared with the detection value $\theta$ of the motor rotor angle sensor 36 by the second comparison segment 46c. The wheel speed based motor rotor angle estimator 46 may correct the correlation between the wheel rotational frequency sensed by the wheel rotational frequency sensor 24 and the position of the magnetic poles based on a result of the comparison, and may store the corrected correlation into the magnetic pole position relationship storage 46a.

Figure 11A:
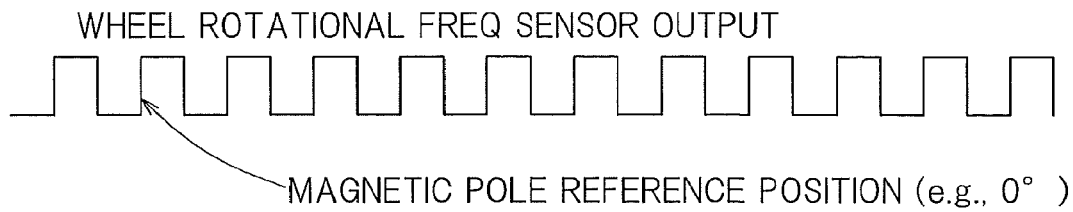
FIG. 11A is a diagram showing pulses which are an output of a wheel rotational frequency sensor in the motor drive devices according to the third to seventh embodiments of the present invention.
Figure 11B:
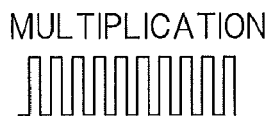
FIG. 11B is a diagram showing a pulse obtained by multiplying the output in FIG. 11A.

More specifically, the wheel speed based motor rotor angle estimator 46 may include a multiplication processing segment 46b, and thus may be configured to multiply the pulses (FIG. 11A) produced from the wheel rotational frequency sensor 24 to generate multiplied pulses (FIG. 11B), and to estimate an angle of the motor rotor. The wheel rotational frequency sensor 24 may be configured to calculate intervals between pulses generated in response to rotation of the wheel and to sense a rotation speed of the wheel as described above.

In the case where the wheel rotational frequency sensor 24 is configured to calculate intervals between pulses generated in response to rotation of the wheel and to sense a rotation speed of the wheel, the wheel speed based motor rotor angle estimator 46 may be configured to measure times between pulses produced from the wheel rotational frequency sensor 24 and to estimate an angle of the motor rotor, instead of providing the multiplication processing segment 46b, and may be configured to sense a motor rotor angle with high accuracy.

Figure 12A:
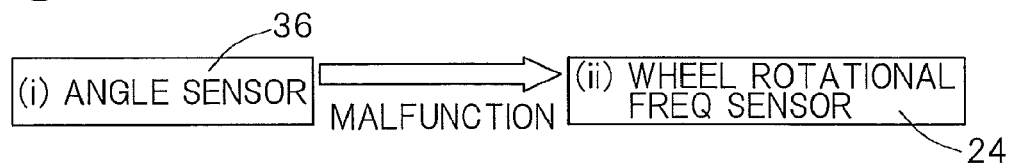
FIGS. 12A and 12B are explanatory diagrams of a mode of switching to estimation of a motor rotor angle in the motor drive devices according to the third and fourth embodiments of the present invention.

Also in the motor drive device 20 according to the third embodiment, similarly to the motor drive device 20 according to the first embodiment, in a state where the motor rotor angle sensor 36 is normal, control based on the position of the magnetic poles may be performed by the general drive controller 38 in accordance with the angle detection value of the motor rotor angle sensor 36 as shown in FIG. 6 (FIG. 12A). A malfunction of the motor rotor angle sensor 36 may be monitored by the sensor malfunction determiner 47a.

Figure 12B:
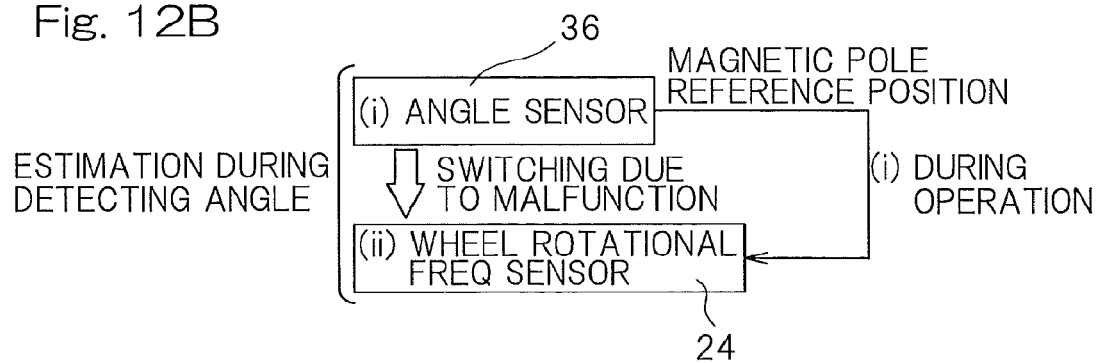

When it is determined as a malfunction by the sensor malfunction determiner 47a, the sensor switcher 47b may cause the general drive controller 38 to perform control using the motor rotor angle produced from the wheel speed based motor rotor angle estimator 46 instead of the angle detection value sensed by the motor rotor angle sensor 36 (FIG. 12B). In other words, in FIG. 10, the sensor switcher 47b may input the motor rotor angle estimated by the wheel speed based motor rotor angle estimator 46 to the current command values calculator 39, the $\alpha$, $\beta$ coordinate converter 42, and the rotating coordinate converter 45.

The motor rotor angle produced from the wheel speed based motor rotor angle estimator 46 may be insufficient in accuracy or reliability as compared to the angle detection value sensed by the motor rotor angle sensor 36 in some cases, but self-travelling is enabled to a place for vehicle repair such as a repair shop, or to a safe evacuation place at a roadside.

The wheel speed based motor rotor angle estimator 46 may use the detection signal of the wheel rotational frequency sensor 24. A general vehicle is equipped with a wheel rotational frequency sensor 24 in order to use the signal therefrom, for example, for controlling an anti-lock-braking system or an attitude control system. Thus, this wheel rotational frequency sensor 24 may be shared, and it is unnecessary to newly add an extra sensor. Thus, without adding an extra sensor, motor driving can be performed when a malfunction occurs in the motor rotor angle sensor 36.

In addition, when the output signal of the wheel rotational frequency sensor 24 is a relative angle output, the wheel speed based motor rotor angle estimator 46 may be configured to obtain the position of the magnetic poles of the rotor (i.e., a reference position of the magnetic poles) based on the signal of the motor rotor angle sensor 36 when the motor rotor angle sensor 36 is normal (FIG. 12B). Thus, during travelling, when the motor rotor angle sensor 36 malfunctions, it is possible to perform switching and use the output signal of the wheel rotational frequency sensor 24 for estimation of a motor rotor angle.

In addition, the wheel speed based motor rotor angle estimator 46 may include the magnetic pole position relationship storage 46a that may be configured to obtain the position of the magnetic poles relative to the detection signal of the wheel rotational frequency sensor 24 based on the angle detection value of the motor rotor angle sensor 36 while the sensor malfunction determiner 47a determines that the motor rotor angle sensor 36 is normal, and to store a correlation between the wheel rotational frequency and the position of the magnetic poles. Thus, it is possible to perform start-up even after the power is turned on again. In other words, in the case where the motor unit 6 includes a synchronous motor or the like, it is impossible to start rotation unless an angle of the motor rotor can be sensed. Since the correlation of the position of the magnetic poles relative to the detection signal of the wheel rotational frequency sensor 24, that is, the positional relationship therebetween, is previously stored in the magnetic pole position relationship storage 46a, it is possible to perform start-up even after the power is turned on again. In addition, in the configuration with the magnetic pole position relationship storage 46a, in order to be able to recognize the position of the magnetic poles even when the wheel is rotated by an external factor in a state where the power is off, the motor rotor angle sensor 36 and the wheel speed based motor rotor angle estimator 46 are desirably configured to start operating when sensing rotation of the wheel even while the power is off.

The motor drive device 20 according to the third embodiment may include the multiplication processing segment 46b, and the wheel speed based motor rotor angle estimator 46 may be configured to multiply pulses produced from the wheel rotational frequency sensor 24 and to estimate an angle of the motor rotor. Thus, high resolution is obtained even by the wheel speed based motor rotor angle estimator 46. Since the wheel rotational frequency sensor 24 is used in an anti-lock-braking system or the like, high resolution is in general unnecessary for the wheel rotational frequency sensor 24, and a sensor having lower resolution than that of the motor rotor angle sensor 36 is used as the wheel rotational frequency sensor 24. However, in the case where the wheel rotational frequency sensor 24 is configured to calculate intervals between pulses and to sense a rotation speed of the wheel, it is possible to improve the resolution of a detected angle by multiplying the pulses, and it is possible to obtain the similar level of resolution as that of the motor rotor angle sensor 36 composed of, for example, a resolver or the like.

Figure 11C:
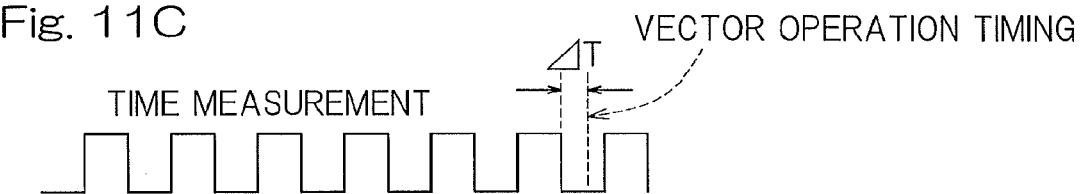
FIG. 11C is a diagram showing a timing of a vector operation on the output in FIG. 11A.

In the case where the wheel rotational frequency sensor 24 is configured to calculate intervals between pulses generated in response to rotation of the wheel and to sense a rotation speed of the wheel, the wheel speed based motor rotor angle estimator 46 may be configured to measure times between pulses produced from the wheel rotational frequency sensor 24 and to estimate an angle of the motor rotor, instead of providing the multiplication processing segment 46b, and thus may be configured to calculate an angle with high accuracy. FIG. 11C shows an example of this situation, and it is possible to calculate an angle with high accuracy by measuring a time ΔT from a pulse trailing edge at each timing of a vector operation. It is to be noted that several tens to several hundreds of timings of the vector operation are present between the pulses. For example, when an angular speed is estimated from the last pulse interval, it is possible to estimate a rotor absolute angle between the pulses by measuring a time from the edge of the pulse. The vector operation timing is a timing indicated by a dotted line.

FIG. 13 shows a motor control circuitry 29A in a motor drive device 20 according to a fourth embodiment of the present invention and components associated with the motor control circuitry 29A. In the motor drive device 20 according to the fourth embodiment, the start-up rotor angle calculator 102 included in the motor drive device 20 according to the second embodiment described with reference to FIG. 9 may be further provided in the motor drive device according to the third embodiment shown in FIG. 10. In the description of the present embodiment, parts that are the same as or correspond to those in the motor drive device according to any one of the first to third embodiments are designated by the same reference numerals, and the detailed description thereof is omitted.

The motor rotor angle calculated by the start-up rotor angle calculator 102 may be inputted to the current command values calculator 39, the α, β coordinate converter 42, and the rotating coordinate converter 45 instead of the motor rotor angle estimated by the wheel speed based motor rotor angle estimator 46 and the detection value of the motor rotor angle sensor 36. At the same time, the motor rotor angle calculated by the start-up rotor angle calculator 102 may be inputted to the wheel speed based motor rotor angle estimator 46, and a correlation between the signal from the wheel rotational frequency sensor 24 and the position of the magnetic poles may be determined.

It is to be noted that the general drive controller 38 may be controlled with the angle calculated by the start-up rotor angle calculator 102, for a determined time period or up to a rotation angle for one cycle in electrical angle of the motor unit at the time of start-up. Thereafter, the output estimated by the wheel speed based motor rotor angle estimator 46 may be used.

In the case where the magnetic pole position relationship storage 46a (FIG. 10) is provided in the wheel speed based motor rotor angle estimator 46, start-up is possible. Thus, the fourth embodiment may be applied to the case where the wheel speed based motor rotor angle estimator 46 is configured to not include the magnetic pole position relationship storage 46a (FIG. 10) in the third embodiment.

The motor drive device according to the fourth embodiment may include the start-up rotor angle calculator 102, and thus the advantages described in connection with the second embodiment are obtained. Specifically, the wheel speed based motor rotor angle estimator 46 may not be used at the time of start-up after stop. However, in an electric vehicle including two or more motor units 6, by travelling to some extent with the operable motor unit(s) 6, the motor unit 6 in which a sensor malfunction has occurred is rotated by rotation of the wheel 2, and it is possible to detect the position of the magnetic poles by detecting a counter electromotive force of the motor unit 6 at that time.

Figure 14:
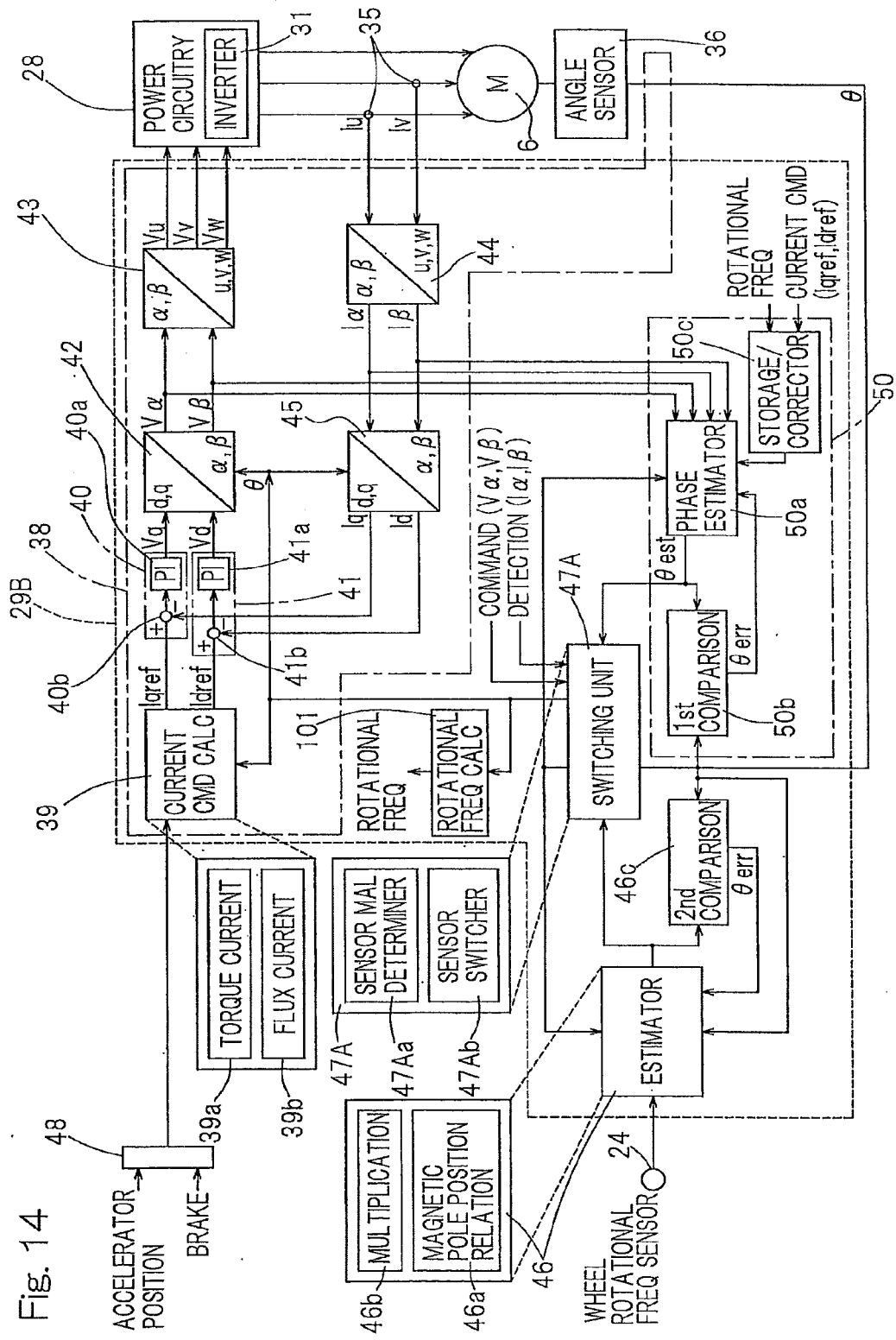
FIG. 14 is a block diagram of a schematic configuration of the motor drive device according to the fifth embodiment of the present invention.

FIG. 14 shows a motor control circuitry 29B in a motor drive device 20 according to a fifth embodiment of the present invention and components associated with the motor control circuitry 29B. The motor drive device 20 according to the fifth embodiment may have the same configuration as that of the motor drive device 20 according to the first embodiment, except for the motor control circuitry 29B, and the configuration described with reference to FIGS. 1 to 4 can be applied thereto as it is. In the description of the present embodiment, parts that are the same as or correspond to those in the motor drive devices according to the first to fourth embodiments are designated by the same reference numerals, and the detailed description thereof is omitted.

The motor control circuitry 29B of the motor drive device 20 according to the fifth embodiment as shown in FIG. 14 may include a general drive controller 38 having the same configuration as those of the motor control circuitries 29 (29A) of the motor drive devices 20 according to the first to fourth embodiments. However, the motor control circuitry 29B of the motor drive device 20 according to the fifth embodiment may include the sensorless angle estimator (first motor rotor angle estimator) 50 (FIG. 5, FIG. 9) of the motor control circuitry 29 of each of the motor drive devices 20 according to the first and second embodiments as well as the wheel speed based motor rotor angle estimator (second motor rotor angle estimator) 46 (FIG. 10, FIG. 13) of the motor control circuitry 29A of each of the motor drive devices 20 according to the third and fourth embodiments.

A sensor malfunction determination sensor switching unit 47A of the motor control circuitry 29B of the motor drive device 20 according to the fifth embodiment may include a sensor malfunction determiner 47Aa that may be configured to determine malfunctions of the motor rotor angle sensor 36 and the wheel rotational frequency sensor 24, and a sensor switcher 47Ab. When the sensor malfunction determiner 47Aa determines that the motor rotor angle sensor 36 malfunctions, the sensor switcher 47Ab may cause the general drive controller 38 to perform control using the motor rotor angle produced from the wheel speed based motor rotor angle estimator 46 instead of the angle detection value sensed by the motor rotor angle sensor 36 (FIG. 15A). Moreover, when the sensor malfunction determiner 47Aa determines that the wheel rotational frequency sensor 24 malfunctions, the sensor switcher 47Ab may cause the general drive controller 38 to perform control using the motor rotor angle produced from the sensorless angle estimator 50 instead of the angle detection value sensed by the motor rotor angle sensor 36 (FIG. 15A).

The determination by the sensor malfunction determiner 47Aa as to a malfunction of the motor rotor angle sensor 36 is as described in connection with the first to fourth embodiments.

When the sensor malfunction determiner 47Aa determines that the motor rotor angle sensor 36 malfunctions, the sensor switcher 47Ab may input the estimation value of the motor rotor angle produced from the wheel speed based motor rotor angle estimator 46 to the current command values calculator 39, the α, β coordinate converter 42, and the rotating coordinate converter 45 instead of the detection value of the motor rotor angle sensor 36. It is to be noted that the determination as to a malfunction of the motor rotor angle sensor 36 is performed as described in connection with the first to fourth embodiments.

In addition, when the sensor malfunction determiner 47Aa also determines that the wheel rotational frequency sensor 24 malfunctions, the sensor switcher 47Ab may input the estimation value of the motor rotor angle produced from the phase estimator 50a of the sensorless angle estimator 50 to the current command values calculator 39, the α, β coordinate converter 42, and the rotating coordinate converter 45.

For example, when the wheel rotational frequency sensor 24 exhibits a high wheel rotational frequency that cannot be assumed or a rapid change in wheel rotational frequency that cannot be assumed, the sensor malfunction determiner 47Aa may determine that the wheel rotational frequency sensor 24 malfunctions. A wheel rotational frequency that can be taken by the wheel rotational frequency sensor 24, or its change rate are uniquely-determined based on the rated output of the motor unit 6, the vehicle body weight, or the like. Thus, an appropriate threshold or range may be defined for the wheel rotational frequency or its change rate, and when the wheel rotational frequency or its change rate exceeds the threshold or the range, it may be determined that the wheel rotational frequency sensor 24 malfunctions. Regarding the determination by the sensor malfunction determiner 47Aa as to a malfunction of the wheel rotational frequency sensor 24, when a relationship such as a ratio between the angle detection value of the motor rotor angle sensor 36 and the wheel rotational frequency sensed by the wheel rotational frequency sensor 24 exceeds a predetermined range, it may be determined that the wheel rotational frequency sensor 24 malfunctions. It is to be noted that in this case, it is required that the motor rotor angle sensor 36 has not malfunctioned. In addition, in the case where two or more motor units are provided as in an in-wheel motor type vehicle, comparison with a normal motor rotor angle sensor 36 may be performed.

Figure 16:
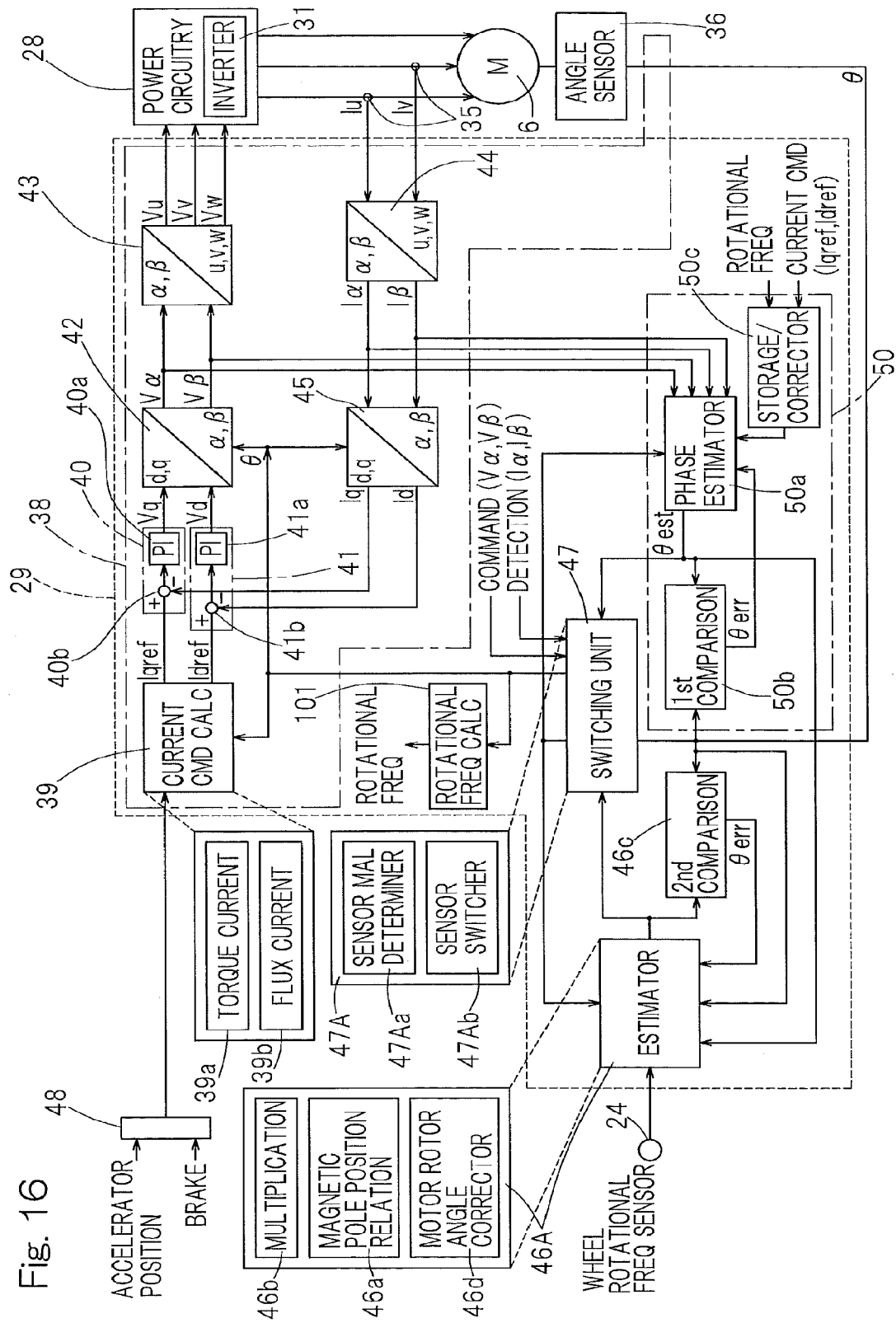
FIG. 16 is a block diagram of a schematic configuration of the motor drive device according to the sixth embodiment of the present invention.

FIG. 16 shows a motor control circuitry 29B in a motor drive device 20 according to a sixth embodiment of the present invention and components associated with the motor control circuitry 29B. The motor drive device 20 according to the sixth embodiment may include a wheel speed based motor rotor angle estimator 46A that is a variation of the wheel speed based motor rotor angle estimator 46 of the motor drive device 20 according to the fifth embodiment shown in FIG. 14. Specifically, the wheel speed based motor rotor angle estimator 46A may include a motor rotor angle corrector 46d in addition to the magnetic pole position relationship storage 46a, the multiplication processing segment 46b, and the second comparison segment 46c that are described in connection with the second and third embodiments. After control of the general drive controller 38 is switched by the sensor switcher 47Ab to control using the motor rotor angle produced from the wheel speed based motor rotor angle estimator 46A (i.e., after a malfunction of the motor rotor angle sensor 36 is detected), the position of the magnetic poles of the motor rotor may be calculated by the sensorless angle estimator 50, and the motor rotor angle corrector 46d may correct a calculation result of the motor rotor angle by the wheel speed based motor rotor angle estimator 46A, using the position of the magnetic poles calculated by the sensorless angle estimator 50.

It is to be noted that the motor rotor angle corrector 46d is effective in the case where the wheel rotational frequency sensor 24 is able to detect only a relative angle change by calculating intervals between pulses generated in response to rotation of the wheel and sensing a rotation speed of the wheel. When the wheel rotational frequency sensor 24 is configured to measure intervals between pulses corresponding to rotation, the wheel rotational frequency sensor 24 is able to calculate an angle from a value obtained by counting the pulses. In other words, the number of pulses in an electrical angle of 360 degrees is known, and when the position of the magnetic poles is identified once, the angle of the motor rotor is identified from the number of pulses. However, when a shift has occurred due to influence of noise or low detection capability, this situation cannot be recognized from the output of the wheel rotational frequency sensor 24. In contrast, it is possible to increase the reliability by periodically amending the angle of the motor rotor using the position of the magnetic poles calculated by the sensorless angle estimator 50. It is to be noted that the other configuration and advantageous effects in the embodiment in FIG. 16 are the same as those in the fifth embodiment described with reference to FIG. 14.

In the motor drive devices 20 according to the fifth and sixth embodiments, in a state where both the motor rotor angle sensor 36 and the wheel rotational frequency sensor 24 are normal, control based on the position of the magnetic poles may be performed by the general drive controller 38 in accordance with the angle detection value of the motor rotor angle sensor 36 as shown in FIG. 6 similarly to the motor drive device 20 according to the first embodiment. A malfunction of the motor rotor angle sensor 36 and a malfunction of the wheel rotational frequency sensor 24 are monitored and determined by the sensor malfunction determiner 47Aa. The determination by the sensor malfunction determiner 47Aa as to these malfunctions may be performed including wiring systems of the motor rotor angle sensor 36 and the wheel rotational frequency sensor 24, or for only the motor rotor angle sensor 36 and the wheel rotational frequency sensor 24.

When the motor rotor angle sensor 36 is determined as malfunctioning by the sensor malfunction determiner 47Aa, the sensor switcher 47Ab may cause the general drive controller 38 to perform control using the motor rotor angle produced from the wheel speed based motor rotor angle estimator 46 (46A) instead of the angle detection value sensed by the motor rotor angle sensor 36. In other words, the motor rotor angle estimated by the wheel speed based motor rotor angle estimator 46 (46A) may be supplied to the current command values calculator 39, the α, β coordinate converter 42, and the rotating coordinate converter 45.

In the case of the sixth embodiment shown in FIG. 16, the function of the sensorless angle estimator 50 can be used for improving the reliability of the wheel speed based motor rotor angle estimator 46A as follows, and this will be described later.

When travelling is performed using the position of the magnetic poles of the motor rotor relative to the detection signal of the wheel rotational frequency sensor 24 due to a malfunction of the motor rotor angle sensor 36, if the wheel rotational frequency sensor 24 is determined as malfunctioning by the sensor malfunction determiner 47Aa, the sensor switcher 47Ab may cause the general drive controller 38 to perform control using the motor rotor angle produced from the sensorless angle estimator 50, as in the first embodiment described with reference to FIG. 7, instead of the angle (the position of the magnetic poles) produced from the wheel speed based motor rotor angle estimator 46A. In other words, the motor rotor angle estimated by the phase estimator 50a of the sensorless angle estimator 50 may be supplied to the current command values calculator 39, the α, β coordinate converter 42, and the rotating coordinate converter 45. Thus, even when malfunctions occur in both the motor rotor angle sensor 36 and the wheel rotational frequency sensor 24, control based on the position of the magnetic poles can be performed by the general drive controller 38.

Figure 15C:
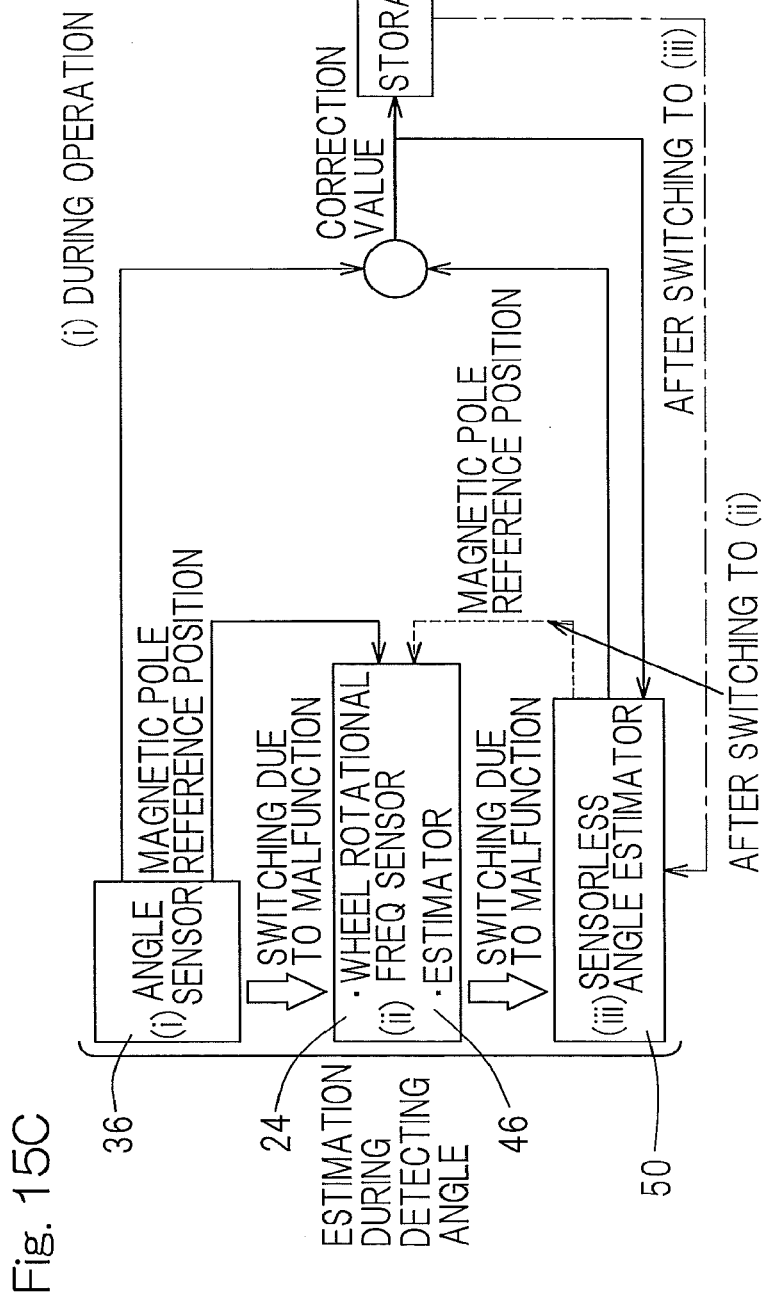

Next, an operation used for improving the reliability of the wheel speed based motor rotor angle estimator 46 will be described with the function of the sensorless angle estimator 50. FIGS. 15B and 15C show its situation. While the motor unit is driven by the general drive controller 38 (FIG. 16) using the angle detection value of the motor rotor angle sensor 36 as described above, the sensorless angle estimator 50 may constantly perform an operation of estimating an angle of the motor rotor, may compare an estimation value of the motor rotor angle with the angle detection value of the motor rotor angle sensor 36, and may correct the estimation value of the motor rotor angle. In FIG. 15B, a signal path in this operation is indicated by solid lines.

When control is performed using the wheel rotational frequency sensor 24 (FIG. 16) and the motor rotor angle estimation value from the wheel speed based motor rotor angle estimator 46A (FIG. 16) due to a malfunction of the motor rotor angle sensor 36 (FIG. 16), the sensorless angle estimator 50 may calculate the position of the magnetic poles of the motor rotor, and a calculation result of the motor rotor angle by the wheel speed based motor rotor angle estimator 46A (FIG. 16) may be corrected by the motor rotor angle corrector 46d based on the obtained position of the magnetic poles (a process indicated by a dotted line in FIG. 15B may be performed).

The reason for this is as follows. When the wheel rotational frequency sensor 24 is configured to measure intervals between pulses corresponding to rotation, the wheel rotational frequency sensor 24 calculates an angle from a value obtained by counting the pulses. In other words, the number of pulses in an electrical angle of 360 degrees is known, and when the position of the magnetic poles is identified once, the angle of the motor rotor is identified from the number of pulses. However, when a shift has occurred due to influence of noise or low detection capability, this situation cannot be recognized from the output of the wheel rotational frequency sensor 24. Thus, by periodically amending the angle of the motor rotor using the position of the magnetic poles calculated by the sensorless angle estimator 50 (FIG. 16), it is possible to increase the reliability of control by the wheel speed based motor rotor angle estimator 46A (FIG. 16).

When the wheel rotational frequency sensor 24 malfunctions, switching to control by the general drive controller 38 using the output estimated by the sensorless angle estimator 50 is performed, and control is performed, as shown in FIGS. 15A to 15C.

Figure 17:
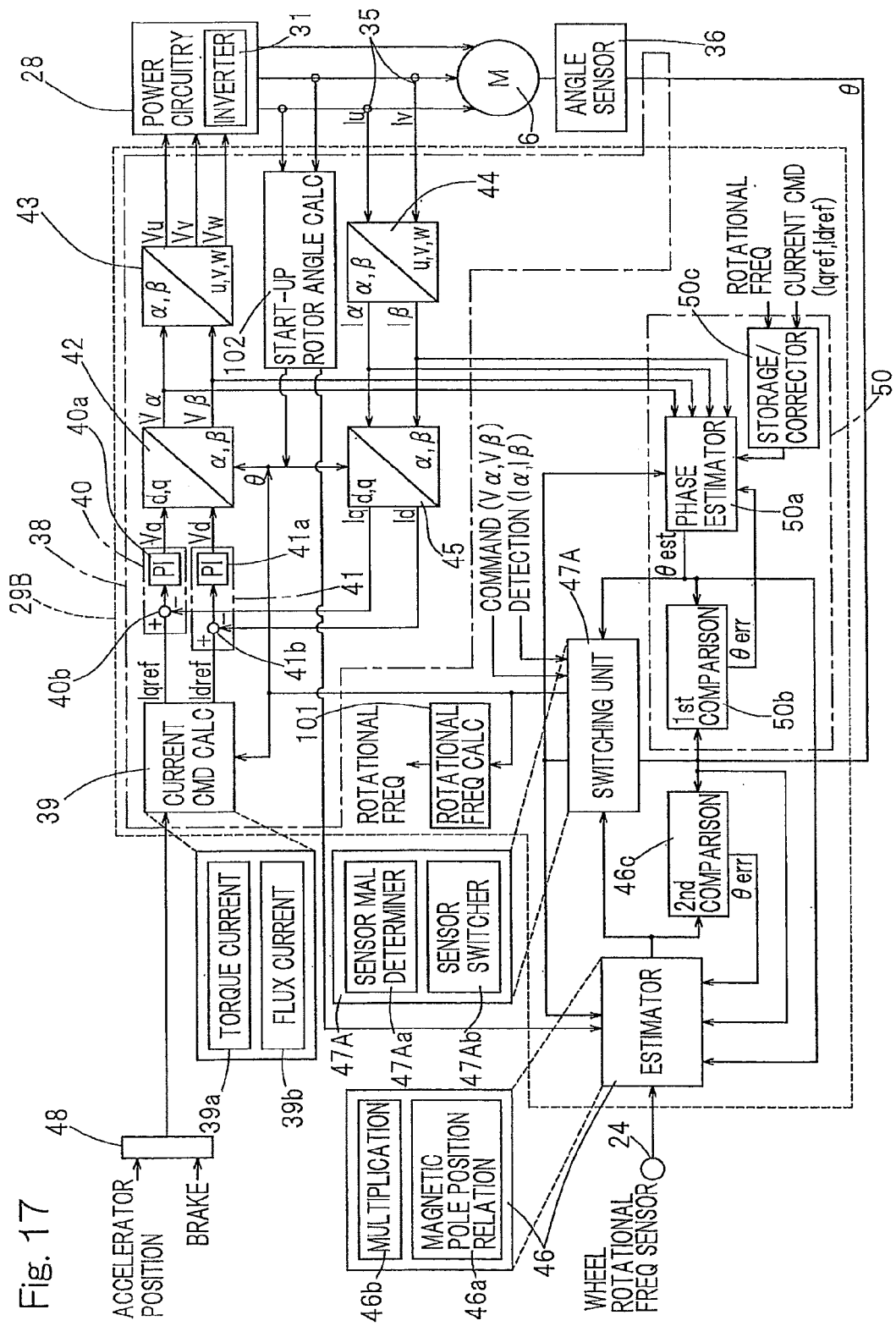
FIG. 17 is a block diagram of a schematic configuration of the motor drive device according to the seventh embodiment of the present invention.

FIG. 17 shows a motor control circuitry 29B in a motor drive device 20 according to a seventh embodiment of the present invention and components associated with the motor control circuitry 29B. In the motor drive device 20 according to the seventh embodiment, the start-up rotor angle calculator 102 included in the motor drive device 20 according to the second embodiment described with reference to FIG. 9 may be further provided in the motor drive device according to the fifth embodiment shown in FIG. 14. In the description of the present embodiment, parts that are the same as or correspond to those in the motor drive device according to any one of the first to fifth embodiments are designated by the same reference numerals, and the detailed description thereof is omitted.

The start-up rotor angle calculator 102 may be configured to calculate an angle of the motor rotor from a counter electromotive voltage of the motor unit 6 and to cause the general drive controller 38 to perform control using the calculated angle, when the motor unit 6 is started up after stop of the motor unit 6 in a state where the motor rotor angle sensor 36 and the wheel rotational frequency sensor 24 are determined as malfunctioning by the sensor malfunction determiner 47Aa. The motor rotor angle calculated by the start-up rotor angle calculator 102 may be inputted to the current command values calculator 39, the α, β coordinate converter 42, and the rotating coordinate converter 45 instead of the output estimated by the wheel speed based motor rotor angle estimator 46 and the detection value of the motor rotor angle sensor 36. At the same time, the motor rotor angle calculated by the start-up rotor angle calculator 102 may be inputted to the wheel speed based motor rotor angle estimator 46, and a correlation between the signal detected by the wheel rotational frequency sensor 24 and the position of the magnetic poles may be determined. In addition, in a state where the wheel rotational frequency sensor 24 is determined as malfunctioning, after driving is performed based on the motor rotor angle calculated by the start-up rotor angle calculator 102, driving may be performed with the sensorless angle estimator 50.

It is to be noted that the general drive controller 38 may be controlled with the angle calculated by the start-up rotor angle calculator 102, for a determined time or up to a rotation angle for one cycle in electrical angle of the motor unit at the time of start-up. Thereafter, the output estimated by the wheel speed based motor rotor angle estimator 46 or the output estimated by the sensorless angle estimator 50 may be used.

The motor drive device according to the seventh embodiment may include the start-up rotor angle calculator 102, and thus the advantages described in the second embodiment are obtained. Specifically, the wheel speed based motor rotor angle estimator 46 and the sensorless angle estimator 50 cannot be used at the time of start-up after stop. However, in an electric vehicle including two or more motor units 6, by travelling to some extent with the operable motor unit(s) 6, the motor unit 6 in which a sensor malfunction has occurred is rotated by rotation of the corresponding wheel 2, and it is possible to detect the position of the magnetic poles by detecting a counter electromotive force of the motor unit 6 at that time.

It is to be noted that in the fifth to seventh embodiments, the sensor switcher 47Ab may perform switching to control using the output of the sensorless angle estimator 50 when the wheel rotational frequency sensor 24 malfunctions, but may not necessarily perform switching to control using the output of the sensorless angle estimator 50.

It is to be noted that in the first to sixth embodiments, it is preferred to provide a unit (not shown) that may be configured to, when the motor rotor angle sensor 36 is determined as malfunctioning or the motor rotor angle sensor 36 and the wheel rotational frequency sensor 24 are determined as malfunctioning by the sensor malfunction determiner 47a (47Aa), inform the ECU 21 so. In addition, the ECU 21 preferably informs the driver of information indicating that the sensorless angle estimator 50 (in the cases of the first embodiment in FIG. 5 and the second embodiment in FIG. 9) or the wheel speed based motor rotor angle estimator 46 (in the cases of the third embodiment in FIG. 10 and the fourth embodiment in FIG. 13) is used due to a malfunction of the motor rotor angle sensor 36 or the sensorless angle estimator 50 (in the cases of the fifth embodiment in FIG. 14, the sixth embodiment in FIG. 16, and the seventh embodiment in FIG. 17) is used due to malfunctions of the motor rotor angle sensor 36 and the wheel rotational frequency sensor 24, with a liquid crystal device, a lamp (not shown), or the like at a console.

Figure 19:
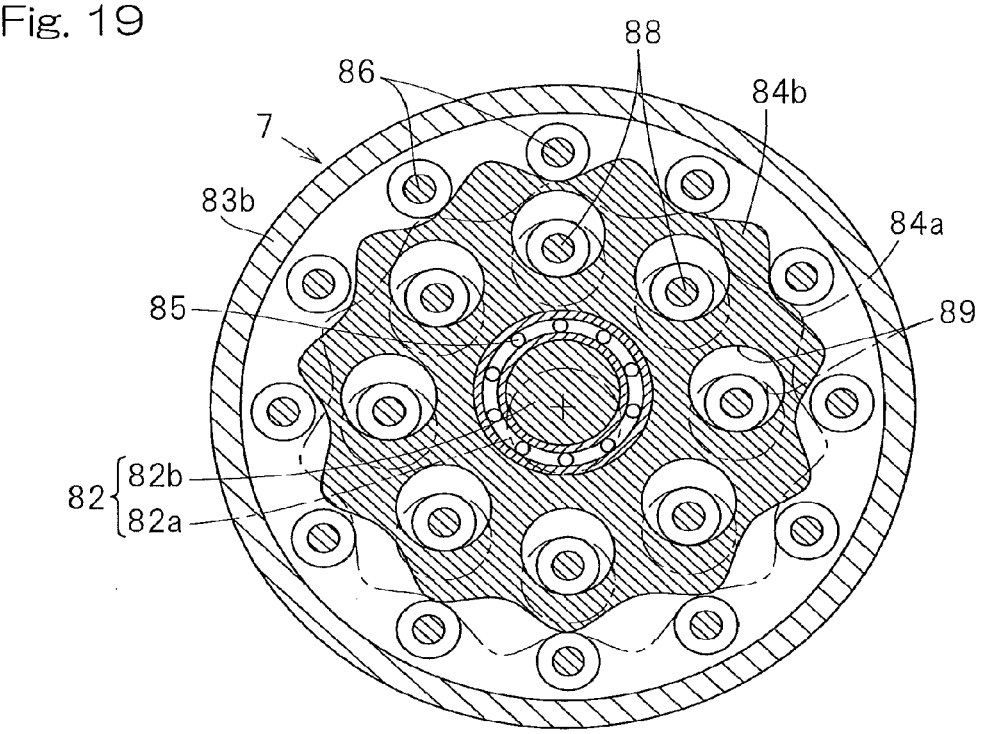
FIG. 19 is a cross sectional view of FIG. 18 taken along the line XIX-XIX.

A particular configuration that the in-wheel motor system 8 may take in any one of the preceding embodiments will now be discussed in connection with FIG. 18 to FIG. 20. The illustrated in-wheel motor system 8 includes a wheel bearing unit 4, a motor unit 6, and a reducer unit 7 interposed between the wheel bearing unit 4 and the motor unit 6, in which the hub of a drive wheel 2 supported by the wheel bearing unit 4 is coaxially coupled with a rotational output shaft 74 of the motor unit 6. The illustrated reducer unit 7 includes a cycloidal reducer which includes a rotational input shaft 82 coaxially connected to the rotational output shaft 74 of the motor unit 6. The rotational input shaft 82 has eccentric segments 82a, 82b. The cycloidal reducer also includes curvilinear plates 84a, 84b mounted via respective bearings 85 to the eccentric segments 82a, 82b, in such a way to transmit the eccentric motions of the curvilinear plates 84a, 84b in the form of a rotary motion to the wheel bearing unit 4. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

The wheel bearing unit 4 includes an outer member 51 having an inner periphery formed with a plurality of rows of raceway surfaces 53, an inner member 52 having an outer periphery formed with raceway surfaces 54 held in face to face relation to those raceway surfaces 53, and a plurality of rows of rolling elements 55 that are interposed between the raceway surfaces 53 of the outer member 51 and the raceway surfaces 54 of the inner member 52. The inner member 52 concurrently serves as a hub for mounting a drive wheel. The illustrated wheel bearing unit 4 includes a double row angular contact ball bearing, in which the rolling elements 55 are in the form of balls rollingly retained by a retainer 56 that is provided one for each row of the balls. The raceway surfaces 53 and 54 have arcuate cross sectional shapes and are formed to have respective contact angles held in back-to-back relation with each other. The outer member 51 and the inner member 52 define an annular bearing space therebetween, and an outboard end of the annular bearing space is sealed by a sealing member 57.

The outer member 51, which serves as a stationary member, is of one piece construction having a flange 51a for attaching to an outboard housing 83b of the reducer unit 7. The flange 51a has bolt insertion holes 64 formed at a plurality of circumferential locations thereof. The housing 83b has bolt receiving holes 94 that are internally threaded at locations thereof corresponding to the respective bolt insertion holes 64. The outer member 51 can be mounted to the housing 83b by screwing into the bolt receiving holes 94 the mounting bolts 65 that are pre-inserted in the bolt insertion holes 94.

The inner member 52, which serves as a rotational member, includes an outboard member 59 having a hub flange 59a for attaching a wheel. The inner member 52 also includes an inboard member 60 which has an outboard side fitted to an inner periphery of the outboard member 59 and which is crimped to be integrated with the outboard member 59. The outboard member 59 and the inboard member 60 have the corresponding rows of the raceway surfaces 54 formed thereon. The inboard member 60 has a center thereof formed with a through bore 61. The hub flange 59a has force-fitting holes 67 at a plurality of circumferential locations thereof for receiving corresponding hub bolts 66. The outboard member 59 has a cylindrical pilot portion 63 for guiding a drive wheel and brake components (both not shown), which is located in the vicinity of the root of the hub flange 59a of the outboard member 59 and is protruding towards the outboard side. A cap 68 closing an outboard end of the through bore 61 is fitted to an inner periphery of the pilot portion 63.

The illustrated reducer unit 7 includes a cycloidal reducer as described. As shown in FIG. 19, the cycloidal reducer includes the two curvilinear plates 84a, 84b, each having an outer contour defined by a smoothly corrugated trochoidal curve, that are mounted via respective bearings 85 to the eccentric segments 82a, 82b of the rotational input shaft 82. A plurality of outer pins 86 are fitted to the housing 83b to directly or indirectly guide, along the outer peripheries thereof, the eccentric motions of the curvilinear plates 84a and 84b. A plurality of inner pins 88, which are fitted to the inboard member 60 of the inner member 52, are inserted to a plurality of corresponding, round through holes 89 formed in each of the curvilinear plates 84a and 84b, to directly or indirectly engage with the through holes 89. The rotational input shaft 82 is splinedly connected to the rotational output shaft 74 of the motor unit 6 for co-rotation. The rotational input shaft 82 is supported on both sides thereof, via two bearings 90, by an inboard housing 83a and by an inner diameter surface of the inboard member 60 of the inner member 52, respectively.

Rotation of the rotational output shaft 74 of the motor unit 6 causes the curvilinear plates 84a, 84b, associated with the rotational input shaft 82 that co-rotates with the rotational output shaft 74, to make eccentric motions. The eccentric motions of the curvilinear plates 84a, 84b are, through the inner pins 88 directly or indirectly engaging with the through holes 89, transmitted in the form of a rotary motion to the inner member 52. The speed of rotation of the inner member 52 is reduced with respect to that of rotation of the rotational output shaft 74. For example, a single-stage cycloidal reducer unit having such a configuration can achieve a reduction ratio of 1/10 or greater.

The two curvilinear plates 84a, 84b are mounted, 180° out of phase with each other, to the eccentric segments 82a and 82b of the rotational input shaft 82, so that the eccentricity of the motions of the curvilinear plates 84a, 84b can be cancelled. Counterweights 91 associated with the respective eccentric segments 82a, 82b, are each disposed at a side of the corresponding one of the eccentric segments 82a, 82b, in such a way that the counterweights 91 face each other across the eccentric segments 82a, 82b while each of the counterweights 91 being displaced in a direction opposite to the direction of displacement of the corresponding one of the eccentric segments 82a, 82b. In this way, vibrations that may be caused by the curvilinear plates 84a, 84b can be cancelled out.

Figure 20:
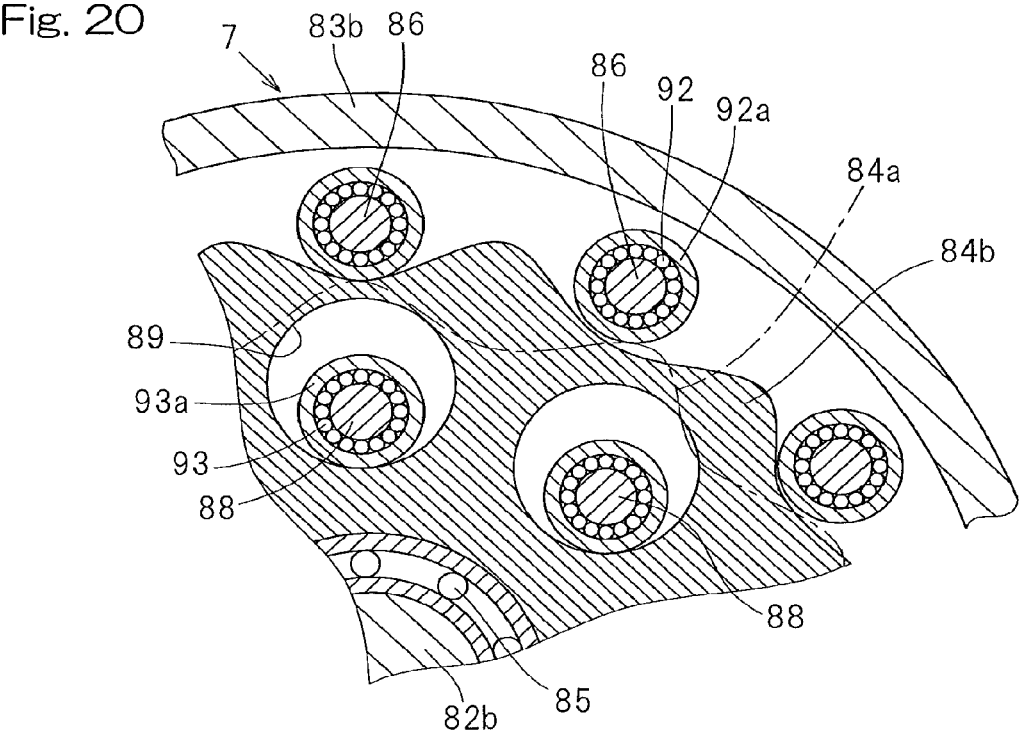
FIG. 20 is a fragmentary enlarged cross sectional view of FIG. 19.

As shown on an enlarged scale in FIG. 20, bearings 92 and bearings 93 may be fitted to the outer pins 86 and the inner pins 88, respectively. The outer rings 92a of the bearings 92 are in rolling contact with the outer peripheries of the curvilinear plates 84a, 84b, while the outer rings 93a of the bearings 93 are in rolling contact with the inner peripheries of the through holes 89. This can minimize the contact friction between the outer pins 86 and the outer peripheries of the curvilinear plates 84a, 84b and the contact friction between the inner pins 88 and the inner peripheries of the through holes 89, thus allowing for smoother transmission of the eccentric motions of the curvilinear plates 84a, 84b in the form of a rotary motion to the inner member 52.

Figure 18:
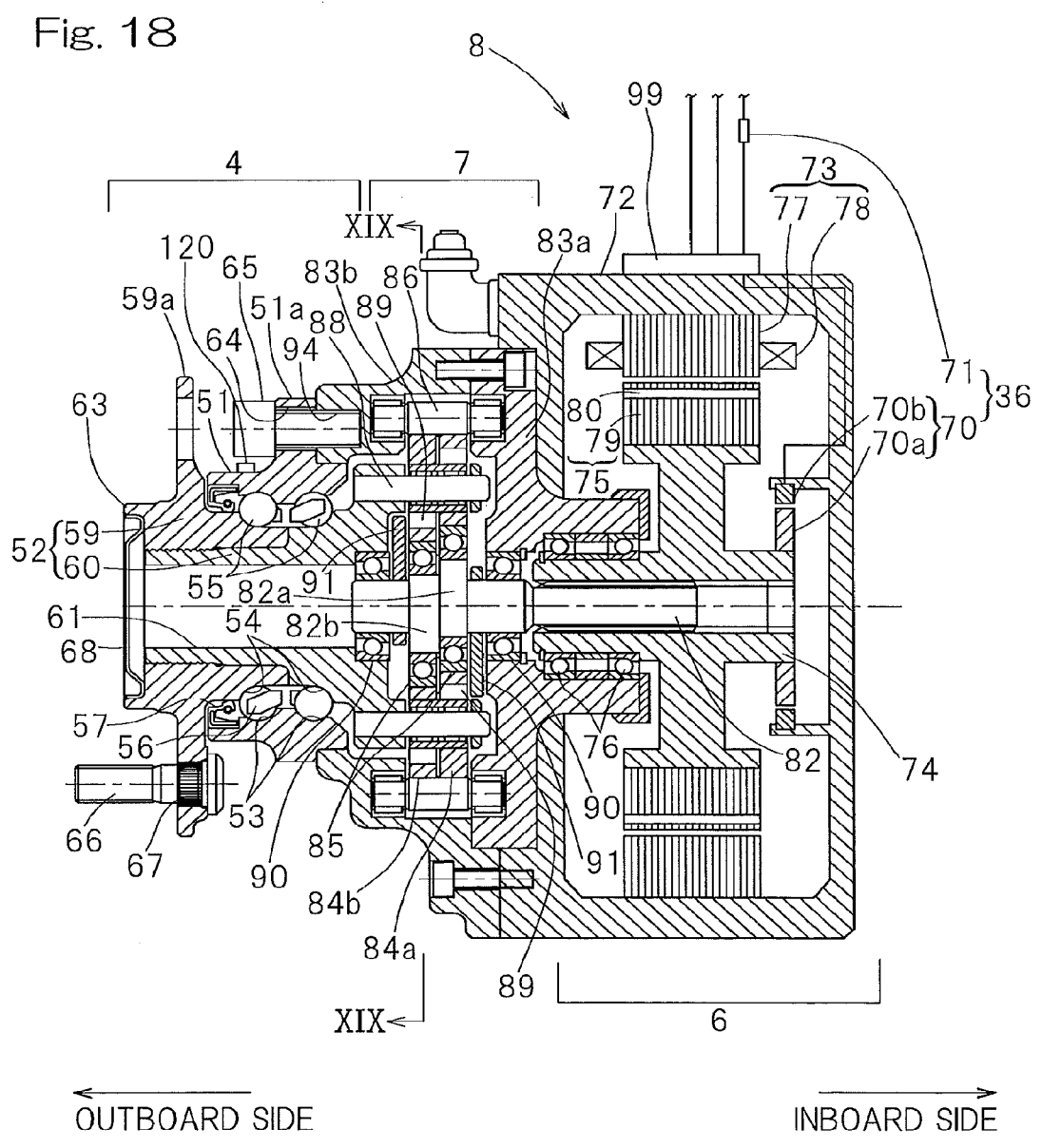

As shown in FIG. 18, the motor unit 6 includes a radial-gap type, IPM motor that includes a motor stator 73 fitted to a cylindrical motor housing 72 and also includes a motor rotor 75 mounted to the rotational output shaft 74, with a radial gap provided between the motor stator 73 and the motor rotor 75. The rotational output shaft 74 is cantilevered via two bearings 76 to a cylindrical segment of the inboard housing 83a of the reducer unit 7.

The motor stator 73 includes a stator core body 77 made of soft magnetic material and also includes coils 78. An outer peripheral surface of the stator core body 77 is fitted to the inner peripheral surface of the motor housing 72. In this way, the stator core body 77 is supported by the motor housing 72. The motor rotor 75 includes a rotor core body 79 mounted onto the rotational output shaft 74 to be coaxial with the motor stator 73 and also includes a plurality of permanent magnets 80 incorporated in the rotor core body 79.

The motor unit 6 may be associated with the angle sensor 36 that may be configured to sense a rotational angle of the motor rotor 75 relative to the motor stator 73. The angle sensor 36 includes an angle sensor body 70 configured to sense signals representing a rotational angle of the motor rotor 75 relative to the motor stator 73 for output and also includes an angle calculation circuit 71 configured to calculate a rotational angle based on the signals produced from the angle sensor body 70. The angle sensor body 70 includes a detectable element 70a associated with the outer peripheral surface of the rotational output shaft 74 and also includes a detector element 70b associated with the motor housing 72. For example, the detector element 70b may be positioned adjacent to the detectable element 70a in a radially opposed fashion. The detectable element 70a and the detector element 70b may be positioned adjacent each other in an axially opposed fashion. Here, the angle sensor 36 may include a magnetic encoder or a resolver. Control of the rotation of the motor unit 6 may be carried out by the aforementioned motor control circuitry 29 (29A, 29B) (e.g., see FIG. 2). A connector 99 may be formed at the motor housing 72 for connection of the wires for a motor current in the in-wheel motor system 8, wires for various sensors, wires for various commands, and etc.

Figure 21:
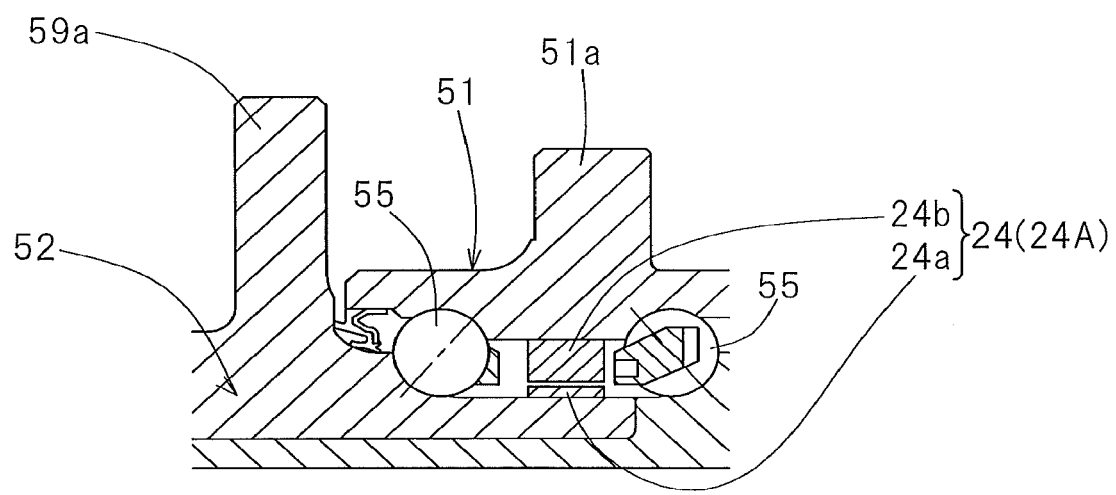
FIG. 21 is a cross sectional view of an example of a rotation sensor in the electric vehicle which includes one of the motor drive devices according to the first to seventh embodiments of the present invention.

FIG. 21 shows an example of the wheel rotational frequency sensor 24 in FIG. 2. The wheel rotational frequency sensor 24 includes a magnetic encoder 24a provided on the outer periphery of the inner member 52 in the wheel bearing unit 4; and a magnetic sensor 24b provided on the outer member 51 in such a fashion as to be opposed to the magnetic encoder 24a. The magnetic encoder 24a is a ring-shaped member in which magnetic poles N, S are alternately magnetized in a circumferential direction thereof. In this example, the rotation sensor 24 is positioned between the rolling elements 55 of both rows, but may be mounted at an end portion of the wheel bearing unit 4.

In the description of each of the preceding embodiments, the embodiment is applied to a four-wheel electric vehicle with two rear drive wheels being driven with the respective motor units that operate independently of each other. Nevertheless, the motor drive device according to the present invention can also be applied to, for example, an electric vehicle with two front wheels being driven with the respective motor units that operate independently of each other, an electric vehicle with all of its four wheels being driven with the respective motor units that operate independently of each other, and an electric vehicle with its wheel(s) being driven with a single motor unit.

Although the present invention has been described in connection with preferred embodiments with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

20 . . . motor drive device
24 . . . wheel rotational frequency sensor
29, 29A, 29B . . . motor control circuitry
36 . . . motor rotor angle sensor 38 . . . general drive controller
47 . . . sensor malfunction determination sensor switching unit
47a . . . sensor malfunction determiner
47b . . . sensor switcher
46 . . . wheel speed based motor rotor angle estimator
50 . . . sensorless angle estimator

What is claimed is:

1. A motor drive device comprising:
a general drive controller configured to control a motor unit for driving a wheel of an electric vehicle depending on a position of magnetic poles by using an angle detection value sensed by a motor rotor angle sensor provided at the motor unit;
a first motor rotor angle estimator configured to estimate an angle of a motor rotor of the motor unit without using a rotation sensor;
a second motor rotor angle estimator configured to estimate an angle of the motor rotor from a detection signal sensed by a wheel rotational frequency sensor configured to sense a rotation speed of the wheel driven by the motor unit;
a sensor malfunction determiner configured to determine a malfunction of the motor rotor angle sensor; and
a sensor switcher configured to cause the general drive controller to perform control using an estimation value of the motor rotor angle estimated by the one motor rotor angle estimator instead of the angle detection value sensed by the motor rotor angle sensor once the sensor malfunction determiner determines that the motor rotor angle sensor malfunctions, wherein
the sensor malfunction determiner further determines a malfunction of the wheel rotational frequency sensor, and
the sensor switcher causes the general drive controller to perform control using an estimation value of the motor rotor angle estimated by the second motor rotor angle estimator once the sensor malfunction determiner determines that the motor rotor angle sensor malfunctions, and the sensor switcher causes the general drive controller to perform control using an estimation value of the motor rotor angle estimated by the first motor rotor angle estimator once the sensor malfunction determiner determines that both the motor rotor angle sensor and the wheel rotational frequency sensor malfunction.

2. The motor drive device as claimed in claim 1, wherein the sensor malfunction determiner determines a malfunction of the motor rotor angle sensor based on any one of or both an amount of change in the angle detection value sensed by the motor rotor angle sensor for a given time period and a difference between a command value which is generated by the general drive controller to be supplied to the motor unit and a detection value in the motor unit.

3. The motor drive device as claimed in claim 1, wherein while the general drive controller controls the motor unit depending on the position of the magnetic poles using the angle detection value sensed by the motor rotor angle sensor, the first motor rotor angle estimator constantly estimates an angle of the motor rotor, compares an estimation value of the estimated motor rotor angle with the angle detection value sensed by the motor rotor angle sensor, and performs a correction process such that a difference between the estimation value and the detection value is minimized.

4. The motor drive device as claimed in claim 3, wherein the first motor rotor angle estimator includes: a phase estimator configured to constantly estimate an angle of the motor rotor while the general drive controller controls the motor unit depending on the position of the magnetic poles using the angle detection value sensed by the motor rotor angle sensor; a first comparison segment configured to compare an estimation value estimated by the phase estimator with the angle detection value sensed by the motor rotor angle sensor; and a correction value storage/corrector configured to store a correction value that minimizes a difference between the estimation value and the detection value which difference is a result of the comparison, to determine the correction process based on the stored correction value according to any one of or both a rotational frequency obtained from the wheel rotational frequency sensor or a rotational frequency calculator and a command value which is generated by the general drive controller to be applied to the motor unit, and to perform the correction process.

5. The motor drive device as claimed in claim 1, further comprising a start-up rotor angle calculator configured to calculate an angle of the motor rotor from a counter electromotive voltage of the motor unit and to cause the general drive controller to perform control using the calculated angle, when the motor unit is started up after stop of the motor unit in a state where the motor rotor angle sensor is determined as malfunctioning by the sensor malfunction determiner.

6. The motor drive device as claimed in claim 1, wherein
in the case that the wheel rotational frequency sensor is configured to detect only a relative angle change by calculating intervals between pulses generated in response to rotation of the wheel and sensing a rotation speed of the wheel, the second motor rotor angle estimator calculates a position of the magnetic poles of the motor rotor relative to a detection signal sensed by the wheel rotational frequency sensor based on the angle detection value sensed by the motor rotor angle sensor when the motor unit rotates, and estimates an angle of the motor rotor from the detection signal sensed by the wheel rotational frequency sensor once switching is performed by the sensor switcher such that an estimation value of the motor rotor angle estimated by the second motor rotor angle estimator is used.

7. The motor drive device as claimed in claim 6, wherein the second motor rotor angle estimator includes a magnetic pole position relationship storage configured to store a correlation between the wheel rotational frequency and the position of the magnetic poles by calculating the position of the magnetic poles in accordance with the detection signal sensed by the wheel rotational frequency sensor based on the angle detection value sensed by the motor rotor angle sensor, while the sensor malfunction determiner determines that the motor rotor angle sensor is normal.

8. The motor drive device as claimed in claim 1, wherein
in the case that the wheel rotational frequency sensor is configured to sense a rotation speed of the wheel by calculating intervals between pulses generated in response to rotation of the wheel, the second motor rotor angle estimator is configured to estimate an angle of the motor rotor with multiplying pulses produced from the wheel rotational frequency sensor.

9. The motor drive device as claimed in claim 1, wherein
in the case that the wheel rotational frequency sensor is configured to sense a rotation speed of the wheel by calculating intervals between pulses generated in response to rotation of the wheel, the second motor rotor angle estimator is configured to estimate an angle of the motor rotor with measuring times between pulses produced from the wheel rotational frequency sensor.

10. The motor drive device as claimed in claim 1, wherein
- the first motor rotor angle estimator calculates a position of the magnetic poles of the motor rotor once the sensor switcher performs switching to control using the motor rotor angle produced from the second motor rotor angle estimator, and
- the motor drive device further comprises a motor rotor angle corrector configured to correct a motor rotor angle estimated by the second motor rotor angle estimator, based on the calculated position of the magnetic poles of the motor rotor.

11. The motor drive device as claimed in claim 1, wherein the motor unit is a motor unit in an electric vehicle in which each motor unit is configured to drive a single wheel.

12. The motor drive device as claimed in claim 11, wherein the motor unit is a motor unit which forms a part of an in-wheel motor system mounted adjacent to the wheel.

13. An electric vehicle comprising the motor drive device as claimed in claim 1.

* * * * *